US007496628B2

(12) United States Patent
Arnold et al.

(10) Patent No.: US 7,496,628 B2
(45) Date of Patent: Feb. 24, 2009

(54) ELECTRONIC MESSAGE FILTER

(75) Inventors: John E. Arnold, Westborough, MA (US); Joel K. Greenberg, Gladwyn, PA (US); Edward W. Macomber, Westford, MA (US)

(73) Assignee: Susquehanna International Group, LLP, Bala Cynwyd, PA (US)

( * ) Notice: Subject to any disclaimer, the term of this patent is extended or adjusted under 35 U.S.C. 154(b) by 971 days.

(21) Appl. No.: 10/373,800

(22) Filed: Feb. 25, 2003

(65) Prior Publication Data
US 2004/0177271 A1    Sep. 9, 2004

(51) Int. Cl.
G06F 15/16    (2006.01)
(52) U.S. Cl. .................. 709/206; 709/204; 709/205; 709/207
(58) Field of Classification Search .......... 709/204–207
See application file for complete search history.

(56) References Cited

U.S. PATENT DOCUMENTS

| | | | | |
|---|---|---|---|---|
| 5,493,692 | A | * | 2/1996 | Theimer et al. ............ 455/26.1 |
| 5,832,208 | A | * | 11/1998 | Chen et al. .................... 726/24 |
| 6,023,723 | A | * | 2/2000 | McCormick et al. ........ 709/206 |
| 6,073,133 | A | * | 6/2000 | Chrabaszcz .................. 707/10 |
| 6,161,130 | A | * | 12/2000 | Horvitz et al. .............. 709/206 |
| 6,356,937 | B1 | * | 3/2002 | Montville et al. ........... 709/206 |
| 6,654,787 | B1 | * | 11/2003 | Aronson et al. ............. 709/206 |
| 6,732,157 | B1 | | 5/2004 | Gordon et al. |
| 6,769,016 | B2 | * | 7/2004 | Rothwell et al. ............ 709/206 |

(Continued)

OTHER PUBLICATIONS

Assentor Compliance Reviewing Guide, Aug. 2001, GUAS-100-02, SRA International, Inc., Fairfax, VA.

Primary Examiner—Kenny S Lin
Assistant Examiner—Brian P. Whipple
(74) Attorney, Agent, or Firm—Morgan Lewis & Bockius LLP

(57) ABSTRACT

The present invention is directed to a method and system for identifying content in an unsent electronic message composed by a sender affiliated with a business, wherein the content is potentially not authorized by the business or potentially harmful to the business. An electronic screening tool is applied to the unsent electronic message prior to transmission of the unsent electronic message from a server, associated with the business, to the recipient. The electronic screening tool is programmed to identify content that is potentially not authorized by the business or potentially harmful to the business. The sender's request to transmit the electronic message to the recipient may be automatically cancelled and/or expunged from the server if the output of the electronic screening tool indicates that the unsent electronic message contains content that is potentially not authorized by the business or potentially harmful to the business.

The present invention is also directed to a method for identifying whether a first party is engaging in electronic communications that are potentially harmful to the first party in commercial or residential environments. An electronic screening tool is applied to one or more electronic messages sent or received by the first party. The electronic screening tool is programmed to identify content associated with a situation that is potentially harmful to the first party. An alert message is automatically sent to a second party indicating that the first party may be involved in a situation that is potentially harmful to the first party if the output of the electronic screening tool indicates that the electronic messages contain content associated with a situation that is potentially harmful to the first party.

18 Claims, 12 Drawing Sheets

U.S. PATENT DOCUMENTS

| | | | |
|---|---|---|---|
| 7,136,196 B2 * | 11/2006 | Ishikawa | 358/402 |
| 7,162,738 B2 * | 1/2007 | Dickinson, III et al. | 726/14 |
| 2001/0027474 A1 * | 10/2001 | Nachman et al. | 709/204 |
| 2002/0169954 A1 * | 11/2002 | Bandini et al. | 713/153 |
| 2003/0023736 A1 * | 1/2003 | Abkemeier | 709/229 |
| 2003/0195933 A1 * | 10/2003 | Curren et al. | 709/206 |
| 2005/0188044 A1 * | 8/2005 | Fleming | 709/206 |

* cited by examiner

ELECTRONIC MESSAGE FILTER

FIELD OF THE INVENTION

The present invention is directed to electronic screening tools for managing electronic message communications.

BACKGROUND OF THE INVENTION

In a typical electronic messaging system (e.g., an email system), a user composes a message in an editor and then initiates a 'Send' action. This causes the email client application to (i) move the message into a queue (or folder) where a software component transforms that message into the representation needed by the message transport agent (MTA—e.g., SMTP), (ii) execute code to connect to the message transport agent ("MTA") and (iii) pass the message to the MTA for delivery.

Originally, this was the only manner in which email messages were sent. In a traditional email system 1, an email client 100 sent an electronic message through an outbound message queue 200 which then directed the electronic message to the MTA 140, FIG. 1. The MTA 140 then delivered the electronic message to the recipient's inbox 160. No mechanism existed for any message processing once the Send button was pressed unless the user could find the message and delete it before it had been handed off to the MTA.

SUMMARY OF THE INVENTION

The present invention is directed to a method and system for identifying content in an unsent electronic message composed by a sender affiliated with a business, wherein the content is potentially not authorized by the business or potentially harmful to the business. An electronic screening tool is applied to the unsent electronic message prior to transmission of the unsent electronic message from a server, associated with the business, to the recipient. The electronic screening tool is programmed to identify content that is potentially not authorized by the business or potentially harmful to the business, and is comprised of one or more of the following: a proxy service comprised of a message accessor, a message analyzer and an action manager that is more fully described below. The sender's request to transmit the electronic message to the recipient may be automatically cancelled and/or scraped from the server if the output of the electronic screening tool indicates that the unsent electronic message contains content that is potentially not authorized by the business or potentially harmful to the business. In one embodiment, the sender of the electronic message is automatically sent an electronic alert message indicating that the unsent electronic message contains content that may be objectionable (and optionally indicating that the message has not yet been sent or delivered) if the output of the electronic screening tool indicates that the unsent electronic message contains content that is potentially not authorized by the business or potentially harmful to the business. The sender is provided with at least one of the following options: (i) delete the unsent electronic message and/or scrape the unsent electronic message from the server if the unsent electronic message was previously stored on the server, (ii) revise the unsent electronic message, or (iii) send the unsent electronic message to a supervisor or designated company official for approval. The unsent electronic message may be comprised of any message transmitted by electronic means.

The present invention is also directed to a method for identifying whether a first party is engaging in electronic communications that are potentially harmful to the first party in commercial or residential environments. An electronic screening tool is applied to one or more electronic messages sent or received by the first party. The electronic screening tool is programmed to identify content associated with a situation that is potentially harmful to the first party. An alert message is automatically sent to a second party indicating that the first party may be involved in a situation that is potentially harmful to the first party if the output of the electronic screening tool indicates that the electronic messages contain content associated with a situation that is potentially harmful to the first party.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The overall purpose of the invention is to enable a business to manage the content and transmission of electronic communications. Electronic communications occur between one or more people: either within a business or between a business and its customers/clients or within a residential situation. Even simple electronic communications may have serious implications on a business. Managing the communications effectively helps mitigate the consequences of potentially improper communications.

Communications management may take several forms. Intelligent content-based filtering may prevent intentional and/or accidental electronic communications between people (including employees, companies, agents, representatives, counsel, etc.) governed by rules that protect a business. Examples of electronic messages that may be filtered include but are not limited to: messages relating to legally prohibited activities; messaging relating to ethically prohibited activities; messages containing information about a particular subject matter; messages that could place the sender or company at risk of imprisonment, fines and/or lawsuits; and messages that contain information which a business has determined to prohibit from dissemination.

Communication management may occur by blocking communications between people. This may involve stopping a communication between people based upon identification of users, companies, email addresses and/or content. The management may also involve auditing or logging of communications between people and/or capturing or recording communications between people where copies of the communication are preserved in a database.

It is expected that the communications management policies implemented by the present invention will change over time, and the kinds of communications that are or are not allowed will similarly change over time. Likewise, the type and degree of scrutiny placed on particular messages and/or particular users may vary over time. To accommodate the changing landscape of the activity that an effective electronic messaging filter encounters, the overall design of this invention provides a solution that is configurable, expandable, and designed for high throughput.

This description discusses email systems and the infrastructure surrounding an enterprise email installation as the basis for describing the invention's capabilities and the mechanisms the invention may connect to, use, or implement to provide its functionality. It is to be understood that both the foregoing general description and the following detailed description is not limited to email systems. It is believed that the architecture and design of the invention may be used to effectively manage communications in a variety of electronic media including instant messaging, newsgroups (e.g., Usenet), bulletin boards, telephony, general purpose file system access (including shared folders, drop boxes, ftp, etc.), Lotus Notes data stores, etc.

Figure 1:
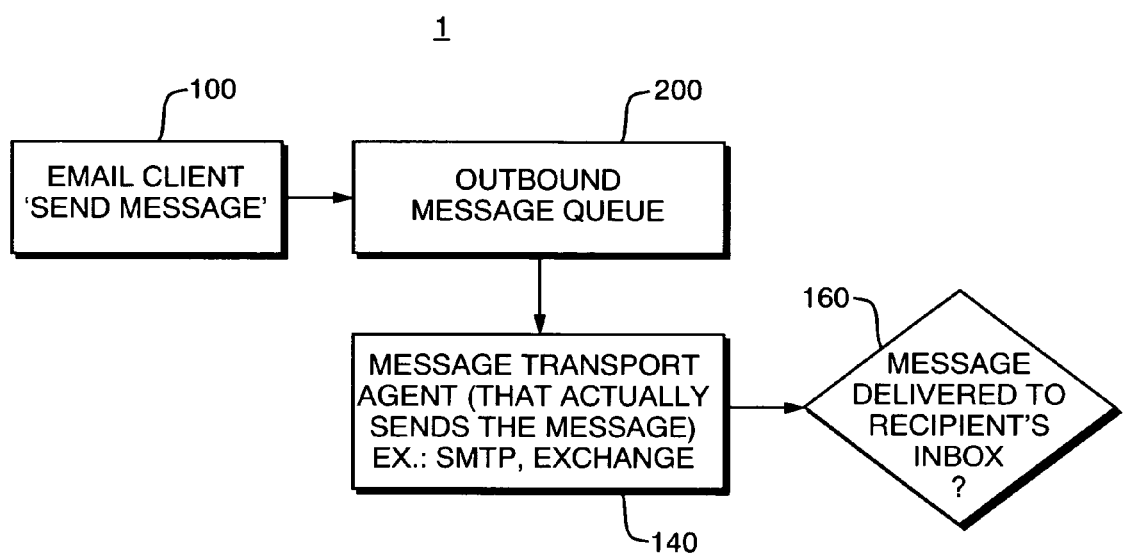
FIG. 1 illustrates an electronic messaging system, using a direct MTA connection, in accordance with the prior art.
Figure 2:
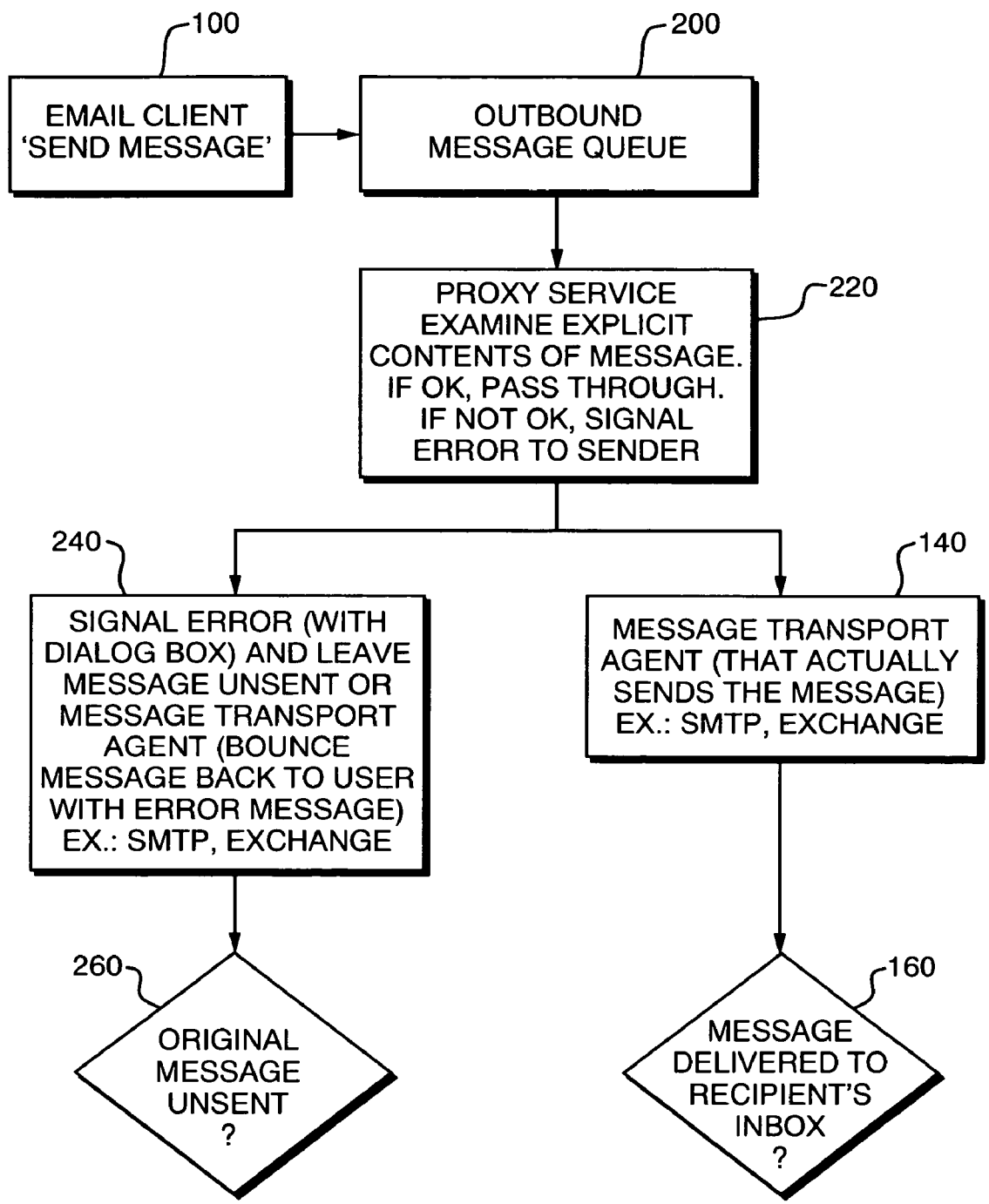
FIG. 2 illustrates an electronic messaging system in combination with a proxy service.

FIG. 2 illustrates a system 2 where a proxy service 220 is injected between the email application and the MTA. An email client 100 sends an electronic message through an outbound message queue 200. A 'proxy service' 220 retrieves (or receives) the message from the outbound message queue 200, and analyzes the message contents to look for the presence of any email viruses. If no virus is found, the message is passed along to the real MTA 140 and then delivered to the recipient's inbox 160. However, if a virus is found, the MTA 240 generates a signal error or returns the unsent message to the user 260.

Figure 3:
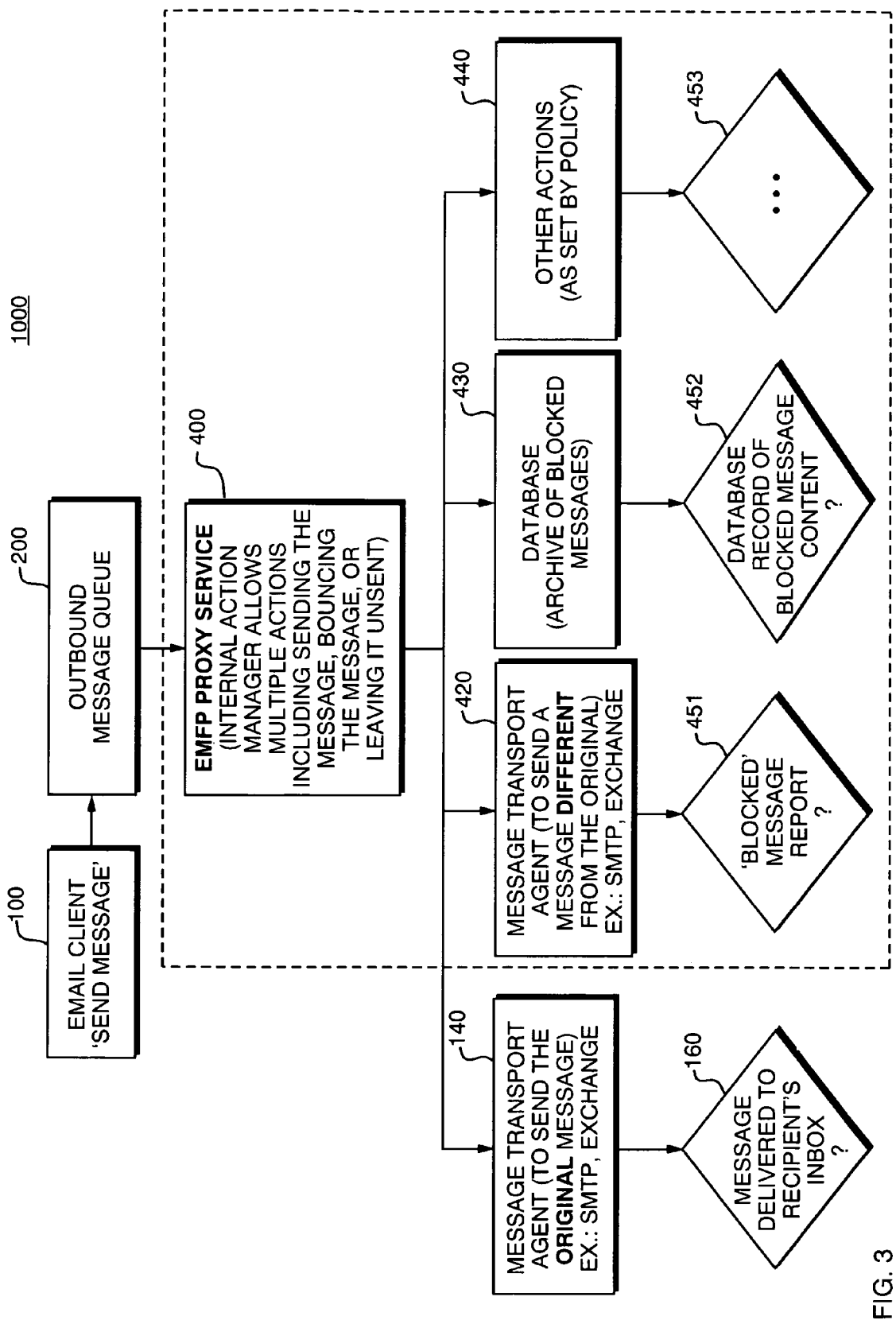
FIG. 3 illustrates an exemplary electronic message filter system, in accordance with a preferred embodiment of the present invention.
Figure 4:
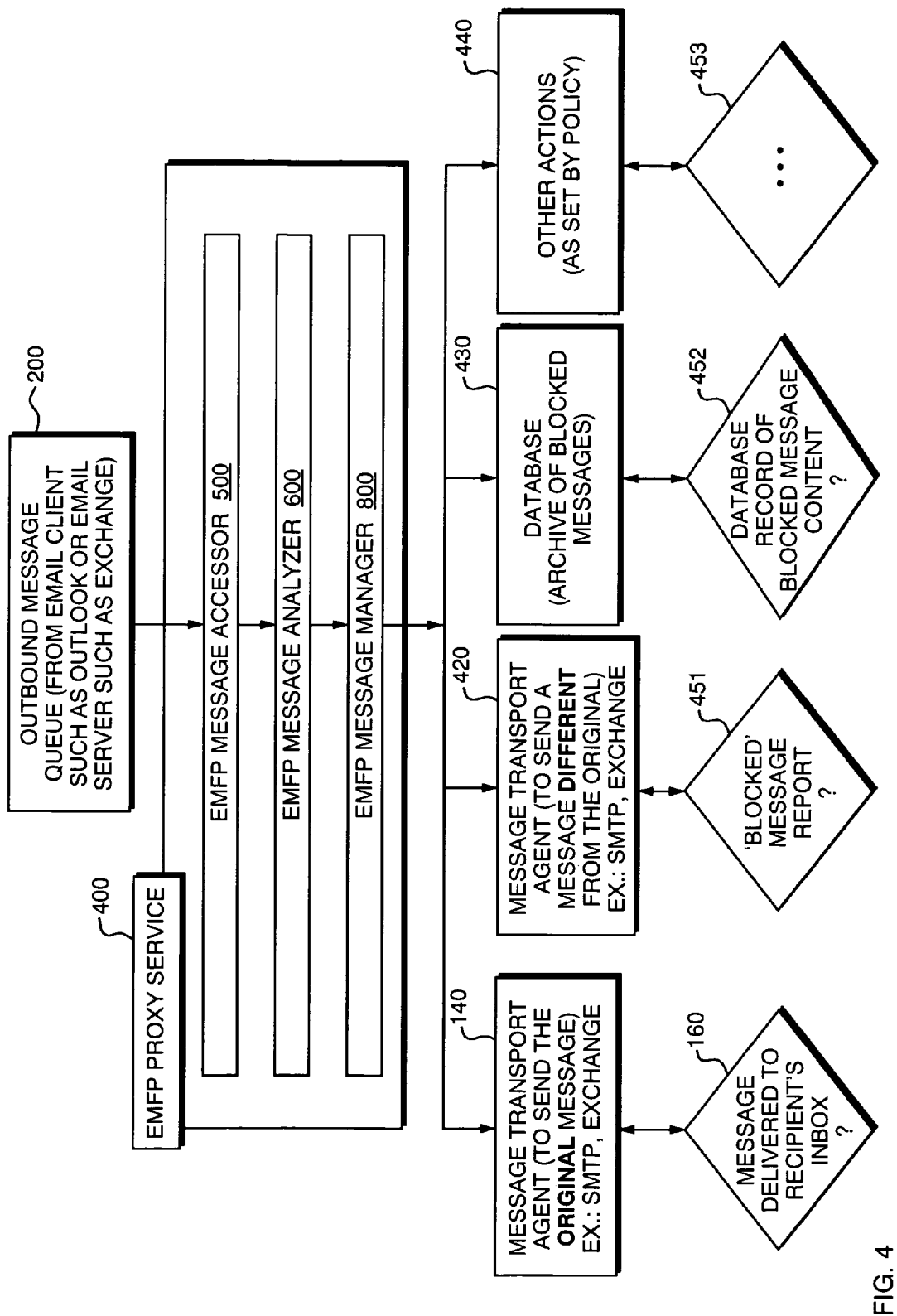
FIG. 4 illustrates an electronic messaging filter proxy service, of the electronic messaging filter system, in accordance with a preferred embodiment of the present system.

FIG. 3 illustrates the preferred embodiment of system 1000 which implements a proxy service style of processing. The preferred implementation of system 1000 is deployed as a proxy service 400 that is inserted between the normal outbound message queue 140 on the mail server (e.g., SMTP/ POP, IMAP, Microsoft Exchange™ environments) and the MTA. For example, in an SMTP/POP environment, the proxy service 400 would replace the normal default port handler for SMTP and process each message with the system 1000 to decide whether to actually pass the message on for delivery to the intended recipients. The proxy service 400 may be implemented on a server.

The preferred embodiment of this invention has adopted a proxy technique for a new purpose: enabling effective, controlled communications management within an enterprise. Business policies are implemented such that messages may be sent, blocked from being sent, archived, expunged etc. consistently throughout the organization according to explicitly defined business policies.

For more loosely coupled email environments that do not use a centralized, enterprise-wide email service (e.g., an enterprise where each employee uses a personal/home SMTP/POP mail account and the SMTP server is not controlled by the enterprise), the system 1000 would be deployed as add-ins to the email client (e.g., a COM add-in to the Microsoft Outlook™ email client.) In this scenario, the proxy service 400 would be installed such that the proxy service 400 processed the message as it was being placed in the sender's outbox rather than when it is uploaded to the MTA. However, this deployment method may be less desirable because it requires installation on each email client and a cumbersome updating process as the rules guiding the processing of the message change.

Because the act of filtering messages needs to accommodate different policies in different environments, the proxy service 400 is not a simple mechanism 'spliced' between the email system's outbound message queue 200 and the MTA 140. Instead, the proxy service's 400 internal action manager 800 may choose between a broad range of 'output actions' 160, 451-453 not just a limited set of email-oriented actions 160.

FIG. 3 illustrates a preferred embodiment of a system 1000 in which a proxy service 400 is inserted between the originating email system 200, represented by the outbound message queue, and the MTA 140, 420. This is similar to the 'Standard Proxy to MTA' system 2 but is augmented with a set of output actions 451-453 that may be completely unrelated to the email system. These output actions may include storing a blocked message in a database 452 or forwarding the message to another person who will decide whether to send or block the message 453. The set of output actions 160, 451-453, of the system 1000, is limited only by the set of output actions 160, 451-453 that may be specified by the action manager 800 of the proxy service 400, described in FIG. 9.

Figure 5:
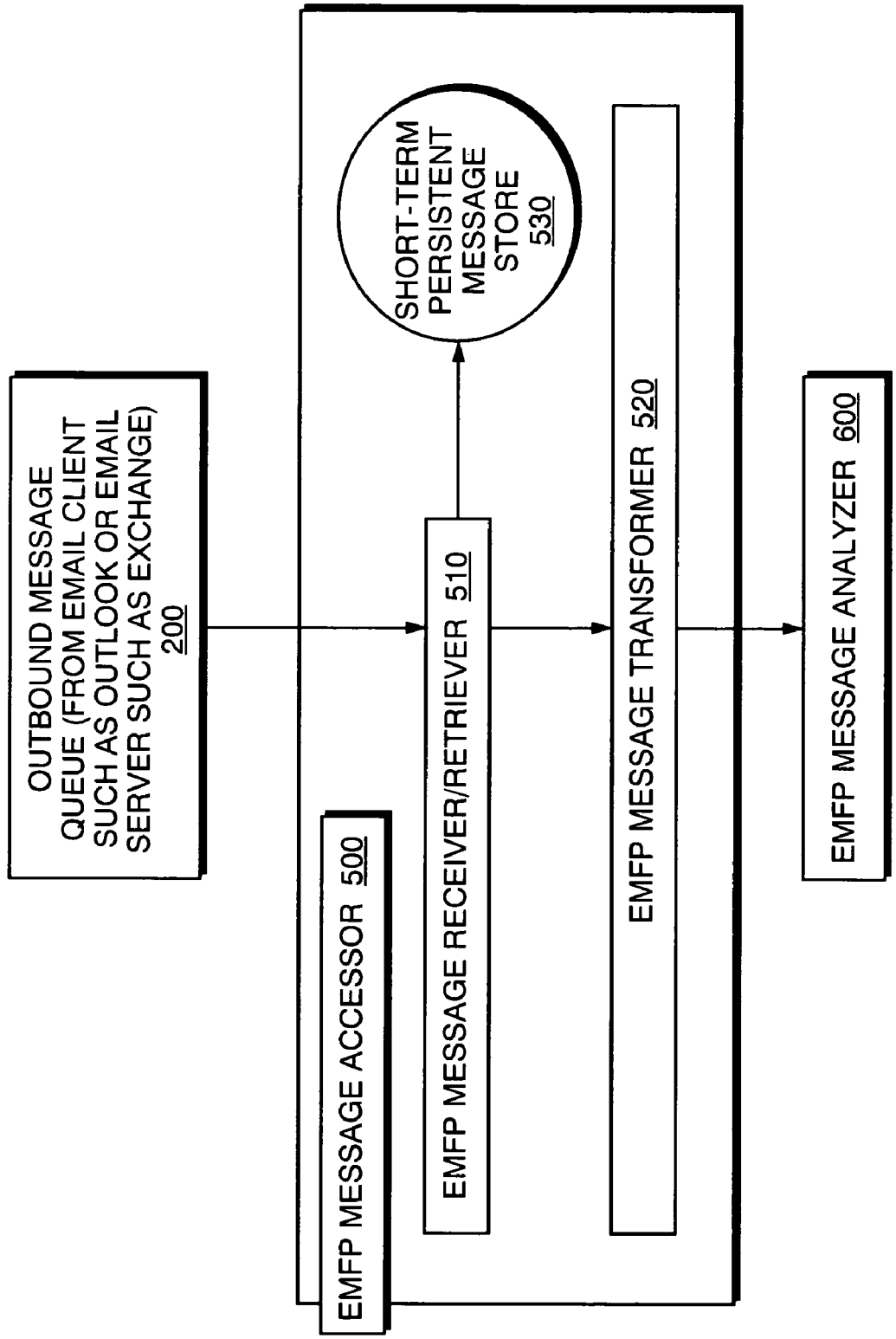
FIG. 5 illustrates a message accessor module, of the electronic messaging filter system, in accordance with a preferred embodiment of the present system.
Figure 6:
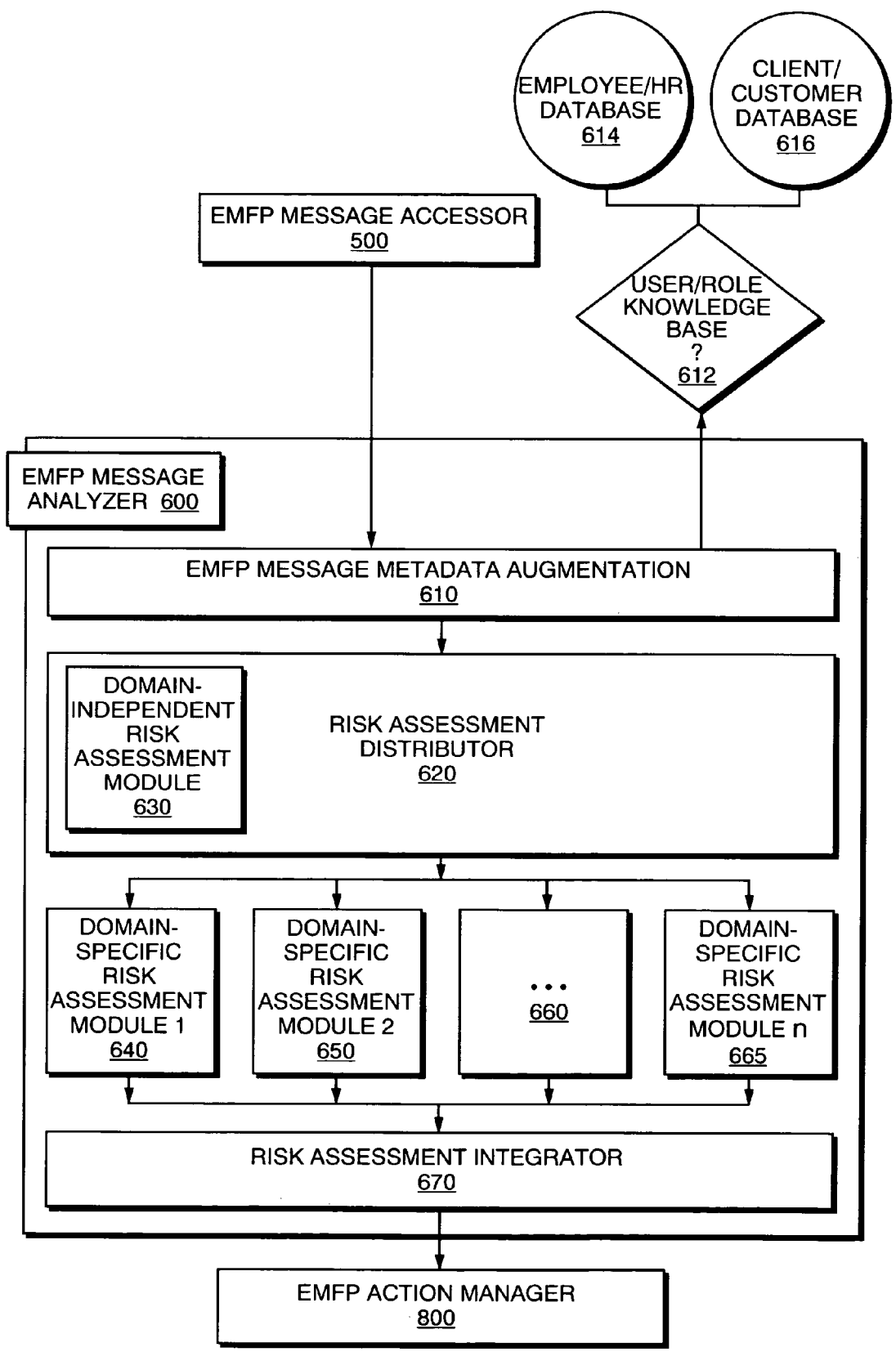
FIG. 6 illustrates a message analyzer module, of the electronic messaging filter system, in accordance with a preferred embodiment of the present system.
Figure 7:
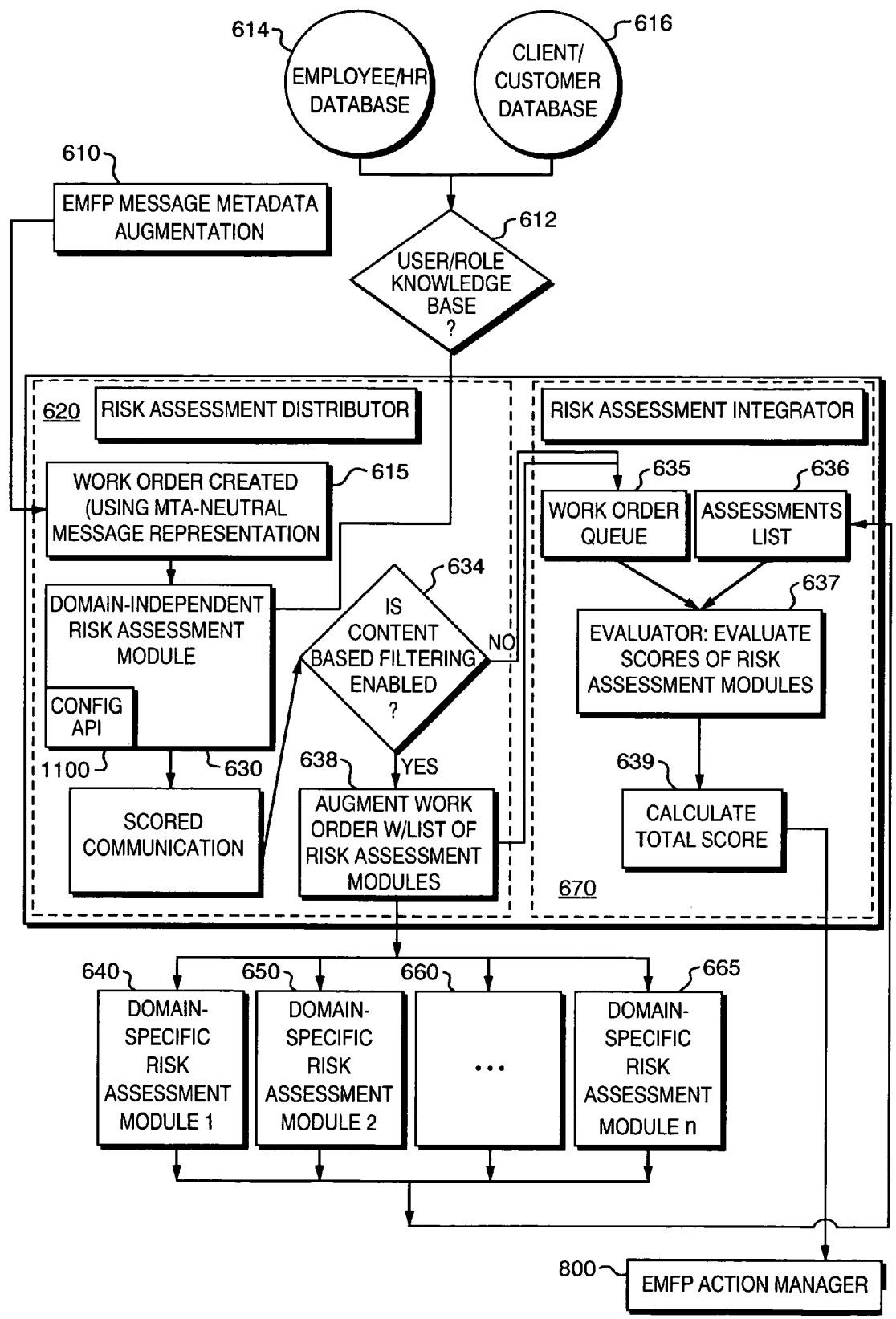
FIG. 7 illustrates the risk assessment distributor and the risk assessment integrator modules, of the electronic message analyzer module, in accordance with a preferred embodiment of the present system.
Figure 8:
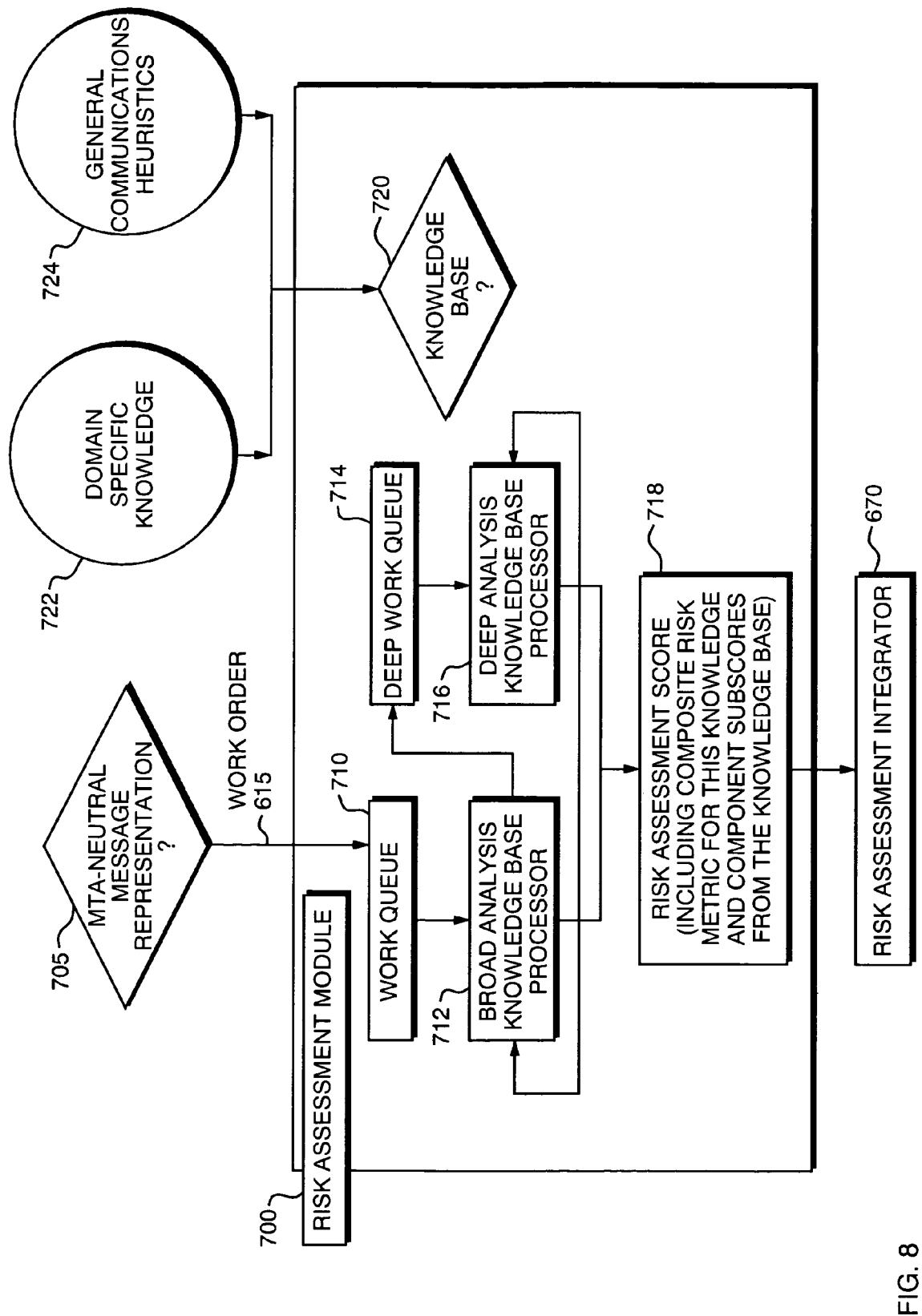
FIG. 8 illustrates the message risk assessment module, of the electronic messaging filter system, in accordance with a preferred embodiment of the present system.

FIGS. 4-9 illustrate the three subsystems of system 1000. The message accessor 500 detects new outbound messages, prepares each message for processing, and passes each message off to the risk assessment process. As illustrated in FIGS. 6-8, the message analyzer 600 augments the original message with some implicit content (e.g., roles of participants in the message), performs a general-purpose, domain-independent risk assessment of the message, initiates the application of domain-specific risk assessment knowledge bases 722 to the message, gathers risk metrics from each risk assessment, and passes the message and the results of the risk assessment to the action manager module 800. Based on the input from the message analyzer module 600, the action manager module 800, FIGS. 4 and 9, determines which action(s) should be taken (e.g., send message, block message, expunge or scrape message, forward message to compliance group for manual review) and invoke the resulting action(s) 451, 452, 453.

These are exemplary actions, not an exhaustive list. Other actions are possible and considered to be within the scope of the invention.

The message accessor 500 connects to the underlying email system to retrieve each message that is waiting to be 'sent.' When implemented inside an email server (the preferred implementation—e.g., an SMTP or Microsoft Exchange™ environment), this module may be implemented as a system program that responds to the calls typically made from an email client to the email server in order to accept the 'outbound' messages from the calling program. For example, in a typical scenario where outbound mail is 'sent' by making a call to TCP/IP port 25 (typically, the SMTP port), this module would be installed on port 25 on the enterprise's email server and emulate USER/PASS and other commands that would allow each outbound message to be uploaded to the proxy service 400 (acting as a gateway to the MTA.) When implemented inside an email client (e.g., Microsoft Outlook™), this module may be implemented as a COM (Component Object Model) Add-in to process the messages from the email client's 'outbox' folder.

Once an outbound message has been received, it is transformed from its original representation (e.g., SMTP message format, Microsoft Exchange™ format) into an MTA-neutral format. Transforming the message into a neutral format allows the subsequent analysis step(s) to act on messages regardless of their original source and, therefore, allows the proxy service 400 (and message accessor 500) to have multiple connections to multiple, different underlying message services. The preferred implementation of the MTA-neutral format is XML. XML is an open standard for data representation that is well supported in databases and other tools and whose explicit 'tagged data' format allows for explicit representation of the information in the message. If necessary, the original message representation may be stored unchanged inside the XML-based MTA-neutral message representation and passed along as the process progresses.

After the original content of the message has been transformed into the MTA-neutral format, the MTA-neutral message representation (Table 2) is passed to the message analyzer 600.

The message accessor 500 may also be implemented in an 'analyze as you author' mode. The benefit of an 'analyze as you author' mode is that it enables a document/message author to understand the ramifications of the message/document being prepared before sending it to anyone else.

This mode would implement a message accessor 500 inside an authoring application (e.g., as a COM add-in to Microsoft Word™ or Microsoft Outlook™ or plug-in to other authoring tools such as Adobe In Design.) In this case, the implementation of the message accessor 500 would capture the current contents of the message in the MTA-neutral format as a snapshot at determined intervals of the authoring process—such as every 3 minutes. The add-in/plug-in would include a mechanism to either (a) run the rest of the system 1000 on the client system where the authoring is occurring or (b) pass the MTA-neutral representation off to the system 1000 running on another accessible machine (on the local network, VPN, etc.) for processing. When processing is complete, the results are passed back to a calling add-in/plug-in in the same format as that is passed to the action manager 800. However, instead of actually taking those actions, the add-in/plug-in may report to the user the action that would likely be taken if those contents were sent.

Running the entire system 1000 on the client machine would require a complete installation of the message accessor 500 and message analyzer 600 on the client machine. In practice, this is possible but may be cumbersome to install and keep up-to-date. In some cases, however, it may be desired since it would allow for accurate analysis on a machine that is completely disconnected from a network e.g., local area network (LAN) or virtual private network (VPN).

Connecting an add-on/plug-in implementation of the message accessor 500 to an existing installation of the message analyzer 600 is a more modular solution that is easier-to-install and easier to maintain. However, it does require a connection to a local area network (LAN) or virtual private network (VPN) in order to work properly.

The role of the message analyzer 600 is to determine whether the contents of a specific electronic message may violate one or more of the enterprise policies for allowable communications. The policies that govern allowable electronic messages may be governed by some rules related to legal requirements, security concerns, ethical aspirations or simply based on subject matter.

To perform this task adequately, the message analyzer 600 needs additional information about the sender and recipient(s) who are involved in the communication. Therefore, in addition to the specific information contained in the message about the sender, intended recipients, etc., the message analyzer 600 uses a user/role knowledge base 612 to extend the explicit information in the message with information that is implicit to the message, FIG. 6. The user/role knowledge base 612 integrates information culled from various enterprise data sources, an employee/human resource database 614 and a customer/client database 616, to augment the MTA-neutral message representation with additional information (metadata) about the role played by each of the sender and recipient(s) in the contents of the electronic message.

As illustrated in FIG. 7, this augmented MTA-neutral message representation is passed along to a subcomponent 620 that distributes the message representation to one or more risk assessment module(s) that applies rules contained in a general purpose, domain-independent risk assessment module 630 about the contents of the electronic message, its participants, etc. and initiates the application of domain-specific risk assessment modules 640, 650, 660, 665 that are applied to the message. This step results in up to two outcomes. First, the general purpose domain-independent risk assessment 630 generates a risk metric that is passed along to the downstream risk assessment integrator. Secondly, the augmented, MTA-neutral message representation is passed to additional, domain-specific risk assessment modules 640, 650, 660 and/or 665 for further processing. These are exemplary modules, not an exhaustive list. Other modules are possible and considered to be within the scope of the invention.

The domain-specific risk assessment modules 640, 650, 660 and/or 665 are designed to contain more detailed rules about a particular risk domain (e.g., collusion, insider trading, fraud, theft of intellectual property, contains sexual content, etc.). They act independently on the MTA-neutral message representation 705 (and may act in parallel in order to get higher throughput.) The outcome of each risk assessment module 640, 650, 660, 665 is a risk metric assigned to the message based on the domain knowledge, rules, etc. that are modeled in the risk assessment module.

When the domain-independent risk assessment module 630 completes its processing, the work order (with the results of the risk assessment module 630) is passed to the risk assessment distribution mechanism 634, 638. This mechanism sets up a process to run and receive the results of the domain-specific modules 640, 650, 660, 665 and waits for them all to complete. Once all domain-specific risk assessment modules 640, 650, 660, 665 have reported their results, the risk assessment integrator 670 compiles an overall risk metric and passes this information along with the MTA-neutral message representation along to the action manager 800.

Figure 9:
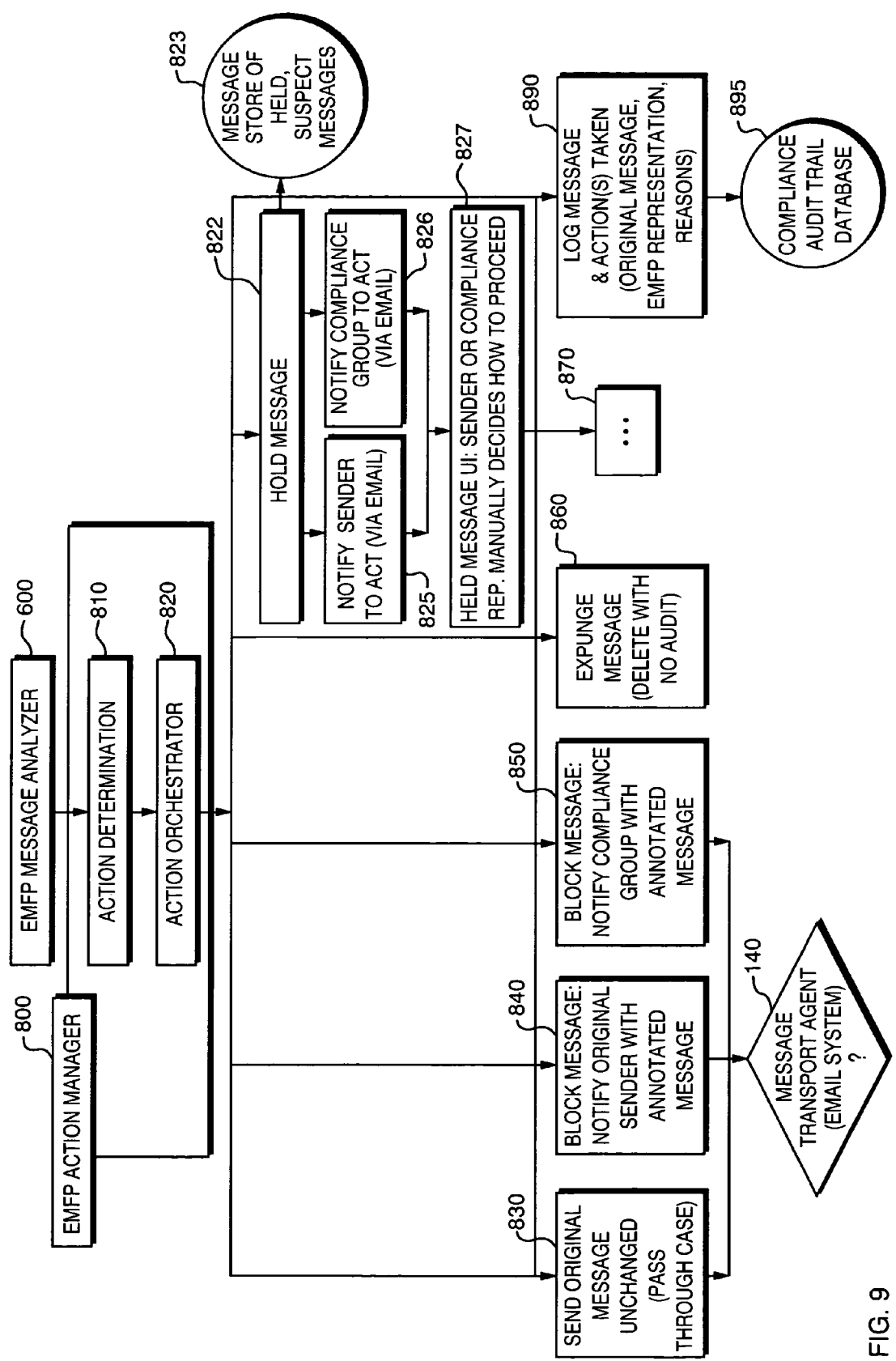
FIG. 9 illustrates the action manager module, of the electronic messaging filter system, in accordance with a preferred embodiment of the present system.

As illustrated in FIG. 9, the action manager will receive several types of information from the message analyzer 600. The received information may include the MTA-neutral message representation including the metadata augmentation to the original message to the action manager 800. The action manager will also receive the overall risk metric score for the message and the risk metric associated with each risk assessment module 630, 640, 650, 660, 665. It will also receive any additional information concerning the reasons for each risk assessment score 718. These risk assessments are inserted into the MTA-neutral message representation 705 thus keeping all of the information about the message in one place.

Given this information, the action manager 800 determines (based on some configurable threshold(s)) what action should be taken. The configuration information also provides a mechanism for the policy maker to assign particular actions with particular risk metrics (or ranges of risk metrics.) The policy maker may allow the message in its original form to be passed on to the MTA 140. (This is what would be expected to happen to a message that poses no or little risk to the enterprise.) The policy maker may block the message from being sent in its original form.

Depending on the severity of the risk, possible response actions to a message that is blocked include any combination of the following: (a) returning the message to the sender with reasons for blocking 840, (b) notifying the enterprise's compliance group that the message was blocked 850 along with reasons for blocking. A message may be marked as 'suspect' but not automatically blocked 822. This may result in the message and the results of the message analyzer 600 being forwarded to the enterprise's compliance group 826 where a person may make a determination of whether to allow the message to pass through or to block the message 827. This 'marking as suspect' process may also inform the sender that the message has been set aside for further review to let the sender know that it hasn't been sent to the intended recipients 825.

The message may be logged in a message audit trail 890. In the preferred implementation, this may be configured to do 'shallow' logging to only note that some activity has occurred. It may also be configured to do 'deep' logging where the original message, the MTA-neutral message representation, and the results of the message analyzer 600 are stored in a database for corporate audit or archival purposes.

After determining what action should be taken, the action manager 800 would invoke the appropriate action(s). Note that, in the normal case, of allowing a message to pass through unfettered, the action manager 800 takes on the role of passing the message to the underlying mail system's MTA such that the message is delivered as intended using the existing email system mechanisms. The system 1000, therefore, does not require replacing an existing email system to provide the benefits of the system.

The message accessor 500 is the entry point for screening the contents of messages by the proxy service 400. It receives/detects new electronic messages, prepares each message for processing, and passes each message off to the message analyzer 600. The message accessor 500 implements two subcomponents: (a) the message receiver/retriever 510 and (b) the message transformer 520.

As illustrated in FIG. 5, the message receiver/retriever 510 is responsible for retrieving or receiving an unsent message into the system 1000 workflow. There are two ways in which the message retriever/receiver 510 subcomponent may be implemented. In the receive mode, it may be called by an external entity to receive messages or, in the retrieve mode, it may poll for messages in an external entity. In either case, it is acting as a transparent gateway to the email system's MTA 140. It is transparent in the sense that, from the point of view of the email system sender, messages are being sent normally with no extra burden placed on the sender to ensure that the message is processed by the system 1000.

In receive mode, this subcomponent 510 implements and exposes an existing messaging API such that this subcomponent 510 may be used in place of the 'real' messaging API. In the retrieve mode, the subcomponent 510 calls software routines or plugs into an email system, to get unsent messages from a folder/queue, where they are waiting for processing. In this model (for example, an email client like Microsoft Outlook Express™), electronic messages that are 'sent' are actually copied to an unsent message queue 200 where periodic processing occurs to forward the message on to the MTA 140. When implemented in retrieve mode 510, the message receiver/retriever 510 replaces or overrides the usual polling mechanism that looks for these waiting messages. Once configured appropriately, the retriever mode 510 retrieves the messages from the unsent message queue 200 in the native format of the MTA that this subcomponent is emulating. For example, the message would be retrieved in SMTP format when reading messages from an outbox for an SMTP-based MTA. This allows the message retriever 510 to act as an SMTP receiver without the native email environment being aware that the message retriever 510 isn't actually a simple SMTP MTA.

Once a message is received by or retrieved into the message receiver/retriever 510, it is written out to a short-term persistent message store 530. This is done to prevent the message from being lost in case of power outage, system crash, or other failure before the message is finally acknowledged as received/retrieved. Note that this message, stored in the short-term persistent message store 530, should be deleted once the proxy service 400 has completed its work on the message.

After the message has been received or retrieved into this subcomponent 510 and written to the temporary persistent storage 530, the message is marked as received to the underlying email system. For example, the message receiver/retriever 510 would return an OK to the SMTP protocol or signal that the underlying unsent message queue 200 may safely delete the message because it has been successfully received by, what it thinks is, the MTA.

At this point, the message (in its native representation—ex: in the SMTP case, a text file that represents all of the various SMTP message headers, message content, etc.) is passed along to the message transformer 520.

The message transformer 520 prepares each message for processing by the message analyzer 600. The preparation consists of transforming the raw, native (MTA-specific) message format to the common MTA-neutral message representation used by the message analyzer 600. Examples of native message formats are the Internet standard SMTP format and the Microsoft Exchange™ format. The common message representation used by system 1000 is based on industry standard XML (Extensible Markup Language—see www.w3.org.).

The message transformer 520 receives a message in its raw, native format from the receiver/retriever 510. For example, a message that was received from an SMTP-based implementation of the message receiver/retriever 510 would pass the message to this subcomponent 520 in its SMTP format:

essentially, a text file that represents the various SMTP message headers, message content, etc.

When the message transformer 520 receives the native message, the caller (typically, the message receiver/retriever 510) also indicates the MTA type of the native electronic message (e.g., SMTP, Microsoft Exchange™) The message transformer 520 uses this information to determine which parser to use to convert the message to the common, MTA-neutral format. Thus, there may be separate-transformers for SMTP, Microsoft Exchange™, etc. message types but each transformer generates the MTA-neutral message representation in the same, XML-based format.

In the following example, the system 1000 has received an SMTP message being sent from john.smith@tradingcompany.com to jane jones@clientcompany.com. John Smith is a financial planner for Trading Company who is letting Jane Jones (one of his clients) know that it is time to re-balance her portfolio and asking if she wants to sell some of her growth stocks to invest in some of her more conservative mutual funds. John has 'sent' the following message by connecting his email client's unsent message queue to the corporate SMTP process on smtp.tradingcompany.com. The salient parts of the unsent SMTP electronic message would appear as shown in Table 1 where the period ('.') at the end of the message indicates that the end of the message body has been reached.

TABLE 1

```
From: 'John Smith' <john.smith@tradingcompany.com>
To: 'Jane Jones' <Jane.Jones@clientcompany.com>
Subject: Time to re-balance your portfolio
Date: Mon, 25 Nov 2002 09:41:29 -0500
Jane:
As the end of the year approaches, it's time to start thinking
about re-balancing your portfolio. I've taken a look at the
holdings in the accounts I manage for you and note that the recent
gains in the market have left you with 73% in Growth investments,
20% in Dividend and Income funds, and 7% in Bonds.
Since our goal is 60/30/10, I think we should sell some of your
Growth investments and re-invest the earnings into your mutual
funds and bonds.
A quick look at your positions shows that you've got some long-
term gains in SampleCompany1, SampleCompany2, and
SampleCompany3. If we sell 500 sh of CPY1, 250 sh of
CPY2, and 1,000 sh of CPY3, we'd be able rebalance
by buying 5,000 sh of MutualFund1 and 1,500 sh of BondFund1.
Let me know if you want me to proceed with the trades or call
if you have questions.
- John -
.
```

The SMTP version of the 'message parser' would recognize the SMTP structure and transform this unsent message into the MTA-neutral, XML-based format shown in Table 2. An optional, configurable aspect of the MTA-neutral, XML-based representation allows the unsent message to be stored unchanged as an <originalMessage> element in the XML (e.g., as a PCDATA structure to avoid any problems with illegal characters.) When enabled, this allows the unsent message to be sent, stored, logged without having to perform a reverse transformation of the MTA-neutral message representation to the original message format.

TABLE 2

```
<?xml version="1.0" encoding="UTF-8"?>
<message id="90125" source="smtp.tradingcompany.com" native-
type="SMTP">
    <dateTime>
        <date dayOfWeek="Monday" month="11" day="25"
```

TABLE 2-continued

```
year="2002"/>
        <time>09:41:29 -0500</time>
    </dateTime>
    <from>
        <displayName>John Smith</displayName>
        <emailAddress>john.smith@tradingcompany.com</emailAddress>
    </from>
    <to>
        <displayName>Jane Jones</displayName>
        <emailAddress>Jane.Jones@clientcompany.com</emailAddress>
    </to>
    <subject>Time to re-balance your portfolio</subject>
    <content>
    Jane:
As the end of the year approaches, it's time to start thinking about
re-balancing your portfolio. I've taken a look at the holdings in the
accounts I manage for you and note that the recent gains in the
market have left you with 73% in Growth investments, 20% in
Dividend and Income funds, and 7% in Bonds.
Since our goal is 60/30/10, I think we should sell some of your
Growth investments and re-invest the earnings into your mutual
funds and bonds.
A quick look at your positions shows that you've got some long-
term gains in SampleCompany1, SampleCompany2, and
SampleCompany3. If we sell 500 sh of CPY1, 250 sh of
CPY2, and 1,000 sh of CPY3, we'd be able rebalance
by buying 5,000 sh of MutualFund1 and 1,500 sh of BondFund1.
Let me know if you want me to proceed with the trades or call
if you have questions.
- John -
    </content>
</message>
```

After a message has been converted into this representation (i.e., the MTA-neutral, XML-based format), the new representation is passed along to the message analyzer 600 (specifically, the message metadata augmentation processor 610.)

As illustrated in FIGS. 6-8, the message analyzer 600 performs the primary filtering work of the system 1000. This component 600 completes the preparation of the message for processing by augmenting the MTA-neutral message representation. With this additional information in place, the message analyzer 600 may perform domain-independent risk assessment of the message as well as domain-specific risk assessment of the message. Each risk assessment compares the information in the message representation to information in a related knowledge base to determine a score ('risk metric') for the message. Once the risk metrics have been aggregated into a composite risk score, the composite metric along with the corroborating detail is added to the message representation. This augmented representation is then passed along to the action manager 800.

The message analyzer 600 is specifically designed to match the requirements needed for a successful communications management product. The system 1000 must have the ability to process messages fast enough such that 'good' messages are delivered in a timely manner and 'bad' messages are handled quickly enough that the enterprise gets the benefits of the communications management without any perception that communications are sluggish. The design accommodates this by providing a multi-level risk assessment process where not every message needs to be subjected to multi-step analysis in all risk domain modules 640, 650, 660, 665.

Not every enterprise will want to analyze messages according to the same criteria. Within an enterprise, circumstances may require that messages sent from one type of sender (or even a specific sender) is treated differently. The system 1000 accommodates this by allowing configuration settings and rules to apply different levels of scrutiny to messages sent by different users or different classes of users. Also, particular domain-specific risk assessment modules 640, 650, 660, 665 may be turned on and off as business policy warrants.

Just as business policy may require that certain risk assessment domains may not be necessary at all times, not every enterprise will want to purchase domain-specific risk assessment modules 640, 650, 660, 665 that it may never need. The design partitions the risk assessment modules 640, 650, 660, 665 into separately installable units in order to accommodate this kind of evolutionary sale or evolutionary deployment. This architecture also provides for the possibility that professional services may be provided to larger customers to develop custom risk assessment modules 660 that build on the feature set of the off-the-shelf product. It also allows for a third-party development market for development of risk-assessment modules.

One easily overlooked subtlety of the standard proxy to MTA of system 2, in FIG. 2, is the assumption that all of the necessary information, concerning the unsent message, is contained in the unsent message. For the case of virus detection, this is an obvious assumption. An electronic message cannot contain a virus that will do any damage unless the message contains the virus (by attaching an infected file as an attachment, incorporating malicious code in the message body, or referring to a potentially malicious Internet reference in the message body.) While the virus prevention use of the proxy technique looks only at the actual content of the message, it is necessary to look beyond the actual explicit content of the message to determine whether to disallow the message in many business communications scenarios. In addition as described below, the invention may be used to disallow the message in residential environments.

For example, many of the heuristics that are needed to determine a risk assessment score 718 are concerned with the role a sender or recipient is representing in the contents of the unsent message. For example: does the sender or the intended recipient(s) represent a stockbroker, a designated insider, a director level, etc. Regardless of the parties' identities that are participating in the contents of the unsent message, information such as this may drive some decisions about what action should be taken on an unsent message.

As illustrated in FIG. 6, the message metadata augmentation module 610 uses the explicit information about the message that is already stored in the MTA-neutral message representation and injects relevant metadata into the representation. The new data is derived from a knowledge base 612 that correlates information from the enterprise's various databases to information in the message. For example, FIG. 6 shows a user/role knowledge base 612 that has been derived from information obtained from the enterprise's employee/HR database 614 and its customer/client database 616.

This user/role knowledge base 612 may include information on an employee's job title, job code, organization/department name, organization code, telephone number, instant messaging username(s). These may be found by matching the employee's email address to the matching record in an employee master file.

The user/role knowledge base 612 may also include information on a client or customer: an employee's customer/client/account number, trading status, social security number, telephone numbers (work/home), instant messaging username(s), director/insider status classification, employer ID for company of which customer is a designated insider (if any), company name, company trading symbol. These may be found by matching the customer's email address to a master customer list and using information in it to cross-reference other databases (e.g., company name/trading symbol.)

Furthermore, the user/role knowledge base 612 may include information from databases and enterprise data sources that may pertain to the relationship between the message sender and recipients. For example, an enterprise's telephone billing/tracking/usage system may be queried to determine the duration and extent of recent telephone communication in a defined time period. Similarly, any auditing of email or instant messaging (whether performed inside the system 1000 or externally) may be queried to determine the duration and extent of email and/or instant messaging communications between the parties in a defined time period (e.g., the previous 30 days). The purpose for gathering this information and augmenting it in the current message's representation is that the upcoming risk assessment may judge/score the message contents differently depending on whether or not a pattern of communications has occurred or is emerging.

Referring back to the example in Table 2, the MTA-neutral message 705 will be augmented in this step by applying knowledge found in the user/role knowledge base 612 to the information known about the message being analyzed. The message metadata augmentation component 610 and the user/role knowledge base 612 has been programmed to look for information about the sender and intended recipients of messages in various databases of employees, customers, consultants, etc. In the example, it is assumed that an entry, for John Smith with an email address of john.smith@tradingcompany.com has been found in the employee database 614. The message metadata augmentation component 610 and the user/role knowledge base 612 have been programmed to get the job code and description for any employee match it finds and add it to the MTA-neutral message representation. John Smith's job code is FP07 (Financial Planner 07).

Similarly, an entry for Jane Jones (with an email address of janejones@clientcompany.com) was found in the customer database 616 as a brokerage account client. The message metadata augmentation component 610 and the user/role knowledge base 612 have been programmed to gather data about any customer that is found and determine additional salient information about the customer that may be helpful during rule analysis. In this case, Jane Jones has previously indicated (during the account signup process) that she is a Director of a publicly traded company—SampleCompany2. The user/role knowledge base 610, 612 are also programmed to find the trading symbol for the publicly traded company, CPY2.

With this information (for an employee: employer, job code, and job description; for a customer/client: brokerage customer role and a 'significant' employee at publicly traded company), the user/role knowledge base 612 has also been programmed to add additional information about any company with which either a sender or intended recipient has a significant relationship. In our case, this means that the employee's information is tagged in the knowledge base 612 with the company name and trading symbol for tradingcompany.com and the customer's information is tagged with the company name and trading symbol for the company of which Ms. Jones is a Director, SampleCompany2. With this information, a final knowledge base rule is initiated that determines whether any of the companies referenced during the course of this message augmentation are inside the window of any significant events (e.g., blackout period for insider trading, SEC reporting due, etc.).

As shown in FIG. 6, the user/role knowledge base 612 is populated with information derived from various enterprise data sources including the employee/HR database 614 and/or the client/customer database 616. The message metadata augmentation component 610 uses the information in the user/role knowledge base 612 to add the information to the MTA-neutral message representation. Both the message metadata augmentation component 610 and the user/role knowledge base 612 operate by applying pattern-matching rules and other processing techniques (e.g., neural nets, genetic algorithms, Bayesian Belief Network, etc.) to trigger the programmed behavior. When all of this activity has been completed, the MTA-neutral message representation includes significant additional information that will be useful to subsequent processing by the risk assessment modules 630, 640, 650, 660, 665 of the message analyzer 600. Table 3 illustrates an example of a representation, of the message from Table 2, following the augmentation step where augmented information appears in bold.

TABLE 3

```
<?xml id="90125" version="1.0" encoding="UTF-8"?>
<message source="smtp.tradingcompany.com" native-type="SMTP">
   <dateTime>
      <date dayOfWeek="Monday" month="11" day="25"
      year="2002"/>
      <time>09:41:29 -0500</time>
   </dateTime>
   <from>
      <displayName>John Smith</displayName>
      <emailAddress>john.smith@tradingcompany.com</emailAddress>
      <employee id="101175">
         <company symbol="TRC" name="Trading Company,
         Inc.">
            <title jobCode="FP" jobLevel="07">Sr.
            Financial
                        Planner</title>
            <insiderBlackout>No</insiderBlackout>
            <SECReportingDue>No</SECReportingDue>
         </company>
      </employee>
   </from>
   <to>
      <displayName>Jane Jones</displayName>
      <emailAddress>Jane.Jones@clientcompany.com</emailAddress>
      <customer acct="120502">
         <company symbol="CPY2" name="SampleCompany2">
            <title jobCode="BoD" jobLevel="10">Board of
                              Directors</title>
            <insiderBlackout>Yes</insiderBlackout>
            <SECReportingDue>No</SECReportingDue>
         </company>
      </customer>
   </to>
   <subject>Time to re-balance your portfolio</subject>
   <content>
   Jane:
```

As the end of the year approaches, it's time to start thinking about re-balancing your portfolio. I've taken a look at the holdings in the accounts I manage for you and note that the recent gains in the market have left you with 73% in Growth investments, 20% in Dividend and Income funds, and 7% in Bonds.
Since our goal is 60/30/10, I think we should sell some of your Growth investments and re-invest the earnings into your mutual funds and bonds.
A quick look at your positions shows that you've got some long-term gains in SampleCompany1, SampleCompany2, and SampleCompany3. If we sell 500 sh of CPY1, 250 sh of CPY2, and 1,000 sh of CPY3, we'd be able rebalance by buying 5,000 sh of MutualFund1 and 1,500 sh of BondFund1.
Let me know if you want me to proceed with the trades or call if you have questions.
- John -
   </content>
</message>

This augmented message representation is then passed on to the risk assessment distributor 620 for analysis.

The risk assessment modules 630, 640, 650, 660, 665 perform the primary scoring of risk for each unsent message. To meet the expected throughput demands, the architecture of the message analyzer 600 is decomposed into three subcomponents: a risk assessment distributor 620; risk assessment module(s) 630, 640, 650, 660, 665; and a risk assessment integrator 670. It is expected that deep analysis by the risk assessment modules 630, 640, 650, 660, 665 will consume significant time. Therefore, the work associated with the message analyzer 600 is partitioned such that the work may be divided into multiple operating systems processes. By having functionality encoded in different processes, the system 1000 will have the ability to use more computing resources and it is expected that it will have the ability to meet the high throughput and scalability demands that provides value to customers.

As illustrated in FIG. 7, the risk assessment distributor 620 has several purposes. It must know how many domain-specific risk assessment modules 640, 650, 660, 665 have been configured and how to connect to each configured domain-specific risk assessment module 640, 650, 660, 665. The component may add routing information as additional metadata to the MTA-neutral message representation. Thirdly, it may create an abstraction called a work order 615 as an internal control object and attach the MTA-neutral message representation 705 to the work order 615. The risk assessment distributor 620 may also augment the work order 615 with routing information and then pass the work order 615 to the appropriate domain-specific risk assessment modules 640, 650, 660, 665. Or it may hand off the work order 615 to the risk assessment integrator 670. Thus, the role of the risk assessment distributor 620 is to parcel out the analysis work intelligently such that the message contents may be scored in as little time, using as few computing resources as possible.

Architecturally, the system 1000 may be designed or may function by assigning an operating system process to each risk assessment module 630, 640, 650, 660, 665 and to both the risk assessment distributor 620 and risk assessment integrator 670. However, there is overhead associated with inter-process communications and with having multiple processes. To minimize the overhead, one operating system process will share the risk assessment distributor 620, the domain-independent risk assessment module 630, and the risk assessment integrator 670.

The explanation for this decision requires looking ahead to some of the component details. The domain-independent risk assessment module 630 performs risk assessment on the contents of every message regardless of (a) the content of the message and (b) which content-based (domain-dependent) options have been configured. The risk assessment integrator 670 performs the inverse task of the risk assessment distributor 620. It looks at the work order 615 and then waits for a response from each risk assessment module 630, 640, 650, 660, 665. Once it receives all responses, it integrates them and computes the final risk score 639 for the message from the separate risk scores 718 of each risk assessment module.

The contents of each message must be processed by the three subcomponents: the risk assessment distributor 620, domain-independent risk assessment 630, and the risk assessment integrator 670. Evaluator 637 extracts out all of the scoring information provided by separate risk assessment modules 630, 640, 650, 660, 665, and uses this information to determine a final risk score for the message 639. Depending on the business environment and the configuration options chosen, a message may not require analysis by a domain-specific risk assessment module 640, 650, 660, 665. Therefore, co-locating subsystems 620, 630, 670 within the same operating system process results in efficient and timely communications management.

As illustrated in FIGS. 7 and 8, a risk assessment module 700 receives a request for processing, in the form of a work order 615. The work order 615 is associated with an MTA-neutral message representation 705. The work order 615 is placed into the risk assessment module's 700 input 'work queue' 710. In most cases, one risk assessment module 700 will be developed for each content area to which filtering will be applied to the unsent message. Thus, if an initial rollout of system 1000 covered the content areas of Collusion, Price Fixing and Corporate Fraud, the installation would typically include 3 risk assessment modules 700.

When a message first arrives for processing by the message analyzer 600, the system 1000 does not know whether the topic area defined in a particular risk assessment module 700 applies. Therefore, the general architecture of a risk assessment module 700 is designed as a two-pass analysis system in order to improve the overall performance and throughput of the risk assessment module 700. During the first pass, a broad analysis processor 712 looks broadly at the message contents to determine whether configuration information or domain-specific information applies to the message contents. In the second pass, a deep analysis knowledge processor 716 performs an in-depth analysis of the message contents.

For example, during the first pass analysis by a domain-specific risk assessment module 640, 650, 660 and/or 665, the message is initially scanned by the broad analysis knowledge base processor 712 looking for occurrence(s) of key words or phrases that appear in the module's 700 associated (content-specific) knowledge base 720 (e.g., Collusion, Price Fixing, Corporate Fraud.) In this first pass, the message content is looked at broadly with the goal of deciding whether or not this message applies to this domain area. This decision is reached by calculating a score for the first pass analysis. The first pass analysis score is calculated by finding matches of the key words or phrases in the knowledge base 720.

Each key word or phrase in the knowledge base 720 will be associated with a match score and an occurrence multiplier. The 'match score' assigns a number of points to the presence of this word/phrase in the message where a higher score indicates that the message is more likely relevant to this content area than a lower score. The 'occurrence multiplier' indicates whether the match score should be applied once for all occurrences (a value of false) or once for each occurrence (a value of 'true'). With this model, the knowledge base designer has the flexibility to influence the outcome of the scoring in two dimensions of key word and phrase usage. The broad analyzer will scan the message's content looking for the key words and phrases and then compute a score. If the resulting score/metric, calculated from the completion of the first pass is low, the work order 615 is passed to the risk assessment integrator 670 thereby bypassing the computational and temporal cost of completing the second pass or deep analysis.

In the second pass, the message content is analyzed further by using one or more artificial intelligence techniques (e.g., forward chaining rules, backward chaining rules, neural nets, genetic algorithms, Bayesian Belief Networks) scoring the message content with each step.

As illustrated in FIG. 8, this multi-pass analysis is implemented by designing the risk assessment module 700 as a multi-threaded process. The risk assessment distributor 620 gives a work order to the risk assessment module 700. The work order is placed in the risk assessment module's work queue 710 until the broad analysis knowledge-based processor 712 retrieves it to complete the first pass analysis.

The broad analysis knowledge-based processor 712 retrieves work orders one at a time from the work queue 710 to analyze. If after the completion of the first pass analysis, the resulting score exceeds a predetermined threshold, the work order 615 is placed into the deep work queue 714, for second pass analysis by the deep analysis knowledge-based processor 716. This processor 716, also scores the message content. Upon completion, the work order 615 is updated to reflect the completed scoring/metric and it is passed to the risk assessment integrator 670.

In particular, the domain-independent risk assessment module 630 uses configuration information 1715 to determine the set of configuration options/features that have been enabled by a business. Computations based on the configured options will associate a risk score with the message. Analysis is performed in a series of steps. First it is determined whether the system is configured to block messages from the sender to anyone. Next it is determined whether the sender or any of the intended recipients was associated with earlier suspect messages. If the answer to any of these inquires is no, then the message content is given a score of zero. If the answer to either inquiry is yes, the MTA-neutral message representation is augmented with the new information, and the document is given a score.

The example, in Table 4, illustrates a rule that may be implemented in a particular instance of a domain-independent risk assessment module 630. In this example, the business situation is that all of the company's financial planners are having their messages logged in response to an investigation about possible trading irregularities. Therefore, the rule states that any employee with a job code containing "FP" (the financial planning job code category) should have messages they send logged, with deep logging, to comply with the needs of the investigation. The sample rules in the example are shown in XML Stylesheet Transformation Language (XSLT.) These serve to demonstrate XSLT (and the XPath operations it includes) as one possible rule processing mechanism that the system 1000 can support.

TABLE 4

```
<?xml version="1.0" encoding="UTF-8"?>
<xsl:stylesheet version="1.0"
    xmlns:xsl="http://www.w3.org/1999/XSL/Transform">
<xsl:template match="/">
  <ActionEnvelope>
    <xsl:apply-templates select="/message/from/employee/company"/>
  </ActionEnvelope>
</xsl:template>
<xsl:template match="company">
  <xsl:if test="@symbol='TRC'">
    <xsl:choose>
      <xsl:when test="title[@jobCode='FP']">
        <ActionRequest>
          <Action>Log Communication - Deep</Action>
          <Reason>Employees in FP job code are having
            messages deep logged due to investigation
            #789
          </Reason>
        </ActionRequest>
      </xsl:when>
    </xsl:choose>
  </xsl:if>
</xsl:template>
</xsl:stylesheet>
```

Table 5 illustrates the result of applying the rule in Table 4 to the MTA-neutral message representation shown in Table 3. The domain-independent risk assessment module 630 would create the following code fragment that would be inserted into the MTA-neutral message representation for later processing.

TABLE 5

```
<ActionEnvelope>
    <ActionRequest>
        <Action>Log Communication - Deep</Action>
        <Reason>Employees in FP job code are having
            messages deep logged due to investigation #789
        </Reason>
    </ActionRequest>
</ActionEnvelope>
```

This shows that the domain-independent risk assessment module 630 can associate an action request to the MTA-neutral message representation. Another example of this kind of domain-independent rule is the case where a brokerage firm has decided that no direct communication is allowed to a competing brokerage firm. If a message were found addressed to said firm, the domain-independent risk assessment module 630 would augment the MTA-neutral message representation 705 with a 'block communication' action request 840, 850. Table 6 illustrates the rule for when 'clientcompany.com' is considered a competitor.

TABLE 6

```
<xsl:template match="from">
    <xsl:if test="contains(emailAddress, 'tradingcompany.com')">
        <xsl:if test="contains(../to/emailAddress,
'clientcompany.com')">
            <ActionRequest>
                <Action>Block Communication</Action>
                <Reason>Employees are not allowed to send messages
                    to competitors. "<xsl:value-of
select="../to/emailAddress"/>"
                    is considered a competitor.</Reason>
            </ActionRequest>
        </xsl:if>
    </xsl:if>
</xsl:template>
```

The domain-independent risk assessment module 630 would add the action request shown in Table 7 to the ActionEnvelope. The ActionEnvelope is the XML structure in the MTA-neutral format that contains the set of action request structures that have resulted from the current processing of the message. Note that Table 5 contains an ActionEnvelope containing one action request. This action request would be added as XML structure inside that XML envelope.

TABLE 7

```
<ActionRequest>
    <Action>Block Communication</Action>
    <Reason>Employees are not allowed to send messages
        to competitors. "Jane.Jones@clientcompany.com"
        is considered a competitor.</Reason>
</ActionRequest>
```

A domain-specific risk assessment module 640, 650, 660, 665 will be developed for each content area (domain) that the system 1000 has chosen to support. Content areas may include price fixing, harassment, collusion, securities fraud, manipulation, discrimination, antitrust, corporate fraud, explicit sexual content, intellectual property protection, the use or sale of illegal drugs, the sale of alcohol or cigarettes to minors, credit car abuse, child molestation, child abduction and others. Because each domain-specific risk assessment module 640, 650, 660, 665 is an instance of the generic risk assessment module 700 the architectural description illustrated in FIG. 8 applies. The sole role of a domain-specific risk assessment module 640, 650, 660, 665 is to score a message according to the knowledge base for its particular domain.

When a domain-specific risk assessment module 640, 650, 660, 665 is built, the vendor supplying the module must also provide a content threshold. The intention is to build system 1000 such that it may an open system, where multiple vendors may provide their own risk assessment modules that would plug into the invention architecture.

The message content is scored relative to the content threshold. If the message contents are determined to have a value higher than the domain-specific risk assessment module's 640, 650, 660, 665 content threshold, then that message may be said to pertain to this module's content/topic area.

The domain-specific risk assessment module will update the MTA-neutral message representation with its score as seen in the example shown in Table 8.

TABLE 8

```
<Score>
    <RiskAssessmentModule>FraudDetector</RiskAssessmentModule>
    <Value>32</Value>
    <ContentThreshold>100</ContentThreshold>
</Score>
```

Table 9 illustrates an example of two-pass processing that acts on an MTA-neutral message representation (as augmented by the domain-independent risk module 630) for a simple Insider Trading risk assessment. The first pass is designed to quickly identify whether there is content in the unsent message that indicates further processing is desired. In the example, the rule established that the presence of some problematic words (e.g., buy, sell, trade, position, portfolio) contributes to the first-pass score. Because the recipient of the message is an insider for a company, that relationship also contributes to the first-pass score.

TABLE 9

```
<?xml version="1.0" encoding="UTF-8"?>
<xsl:stylesheet version="1.0"
    xmlns:xsl="http://www.w3.org/1999/XSL/Transform">
<xsl:variable name="riskAssessmentModuleName"
select="'InsiderTrading'"/>
<xsl:template match="/">
    <!-- layout the output from the assessment -->
    <RiskAssessmentModule>
        <RAMname>
            <xsl:value-of select="$riskAssessmentModuleName"/>
        </RAMname>
        <FirstPassResults>
            <!-- apply the rules for this risk assessment -->
            <xsl:apply-templates select="message"/>
        </FirstPassResults>
    </RiskAssessmentModule>
</xsl:template>
<xsl:template match="message">
    <!-- analyze content for key words and phrases -->
    <xsl:apply-templates select="content"/>
    <!-- analyze recipient -->
    <xsl:apply-templates select="to"/>
</xsl:template>
<!-- Analyze content for keywords -->
<xsl:template match="content">
    <xsl:if test="contains(.,'buy')">
        <keyWordPhrase value='20'>buy</keyWordPhrase>
    </xsl:if>
    <xsl:if test="contains(.,'sell')">
        <keyWordPhrase value='30'>sell</keyWordPhrase>
    </xsl:if>
    <xsl:if test="contains(.,'portfolio')">
```

TABLE 9-continued

```
    <keyWordPhrase value='5'>portfolio</keyWordPhrase>
  </xsl:if>
  <xsl:if test="contains(.,'position')">
    <keyWordPhrase value='5'>position</keyWordPhrase>
  </xsl:if>
  <xsl:if test="contains(.,'gain')">
    <keyWordPhrase value='5'>gain</keyWordPhrase>
  </xsl:if>
  <xsl:if test ="contains(.,'trade')">
    <keyWordPhrase value='3'>trade</keyWordPhrase>
  </xsl:if>
</xsl:template>
<!-- Analyze recipient -->
<xsl:template match="to">
  <!-- Determine company associated with customer -->
  <xsl:variable name="recipientCompany"
    select="customer/company/@symbol"/>
  <!-- Determine if customer's title is an 'insider' level -->
  <xsl:variable name="recipientInsider">
    <xsl:choose>
      <xsl:when test="customer/company/title[@jobCode= 'BoD']">
        <xsl:text>true</xsl:text>
      </xsl:when>
      <xsl:when test="customer/company/title[@jobCode= 'Off']">
        <xsl:text>true</xsl:text>
      </xsl:when>
      <xsl:when test="customer/company/title[@jobCode= 'VP']">
        <xsl:text>true</xsl:text>
      </xsl:when>
      <xsl:otherwise>
        <xsl:text>false</xsl:text>
      </xsl:otherwise>
    </xsl:choose>
  </xsl:variable>
  <xsl:if test="boolean($recipientInsider)">
    <keyRelationship value='50'>
      <company><xsl:value-of select="$recipientCompany"/></company>
      <status>Insider</status>
    </keyRelationship>
  </xsl:if>
</xsl:template>
</xsl:stylesheet>
```

The first-pass assessment to our example in Table 9 results in an intermediate result, illustrated in Table 10, that the broad analysis knowledge base processor 712 can use to determine a first-pass score.

TABLE 10

```
<RiskAssessmentModule>
    <RAMname>InsiderTrading</RAMname>
```

TABLE 10-continued

```
    <FirstPassResults>
        <keyWordPhrase value="20">buy</keyWordPhrase>
        <keyWordPhrase value="30">sell</keyWordPhrase>
        <keyWordPhrase value="5">portfolio</keyWordPhrase>
        <keyWordPhrase value="5">position</keyWordPhrase>
        <keyWordPhrase value="5">gain</keyWordPhrase>
        <keyWordPhrase value="3">trade</keyWordPhrase>
        <keyRelationship value="50">
            <recipient/>
            <company>CPY2</company>
            <status>Insider</status>
        </keyRelationship>
    </FirstPassResults>
</RiskAssessmentModule>
```

The result of processing this intermediate result, Table 10, is illustrated in Table 11.

TABLE 11

```
<Score>
    <RiskAssessmentModule>InsiderTrading</RiskAssessmentModule>
    <Value>118</Value>
    <ContentThreshold>100</ContentThreshold>
</Score>
```

Because the first-pass score exceeds the defined content threshold, the second pass analysis is performed by the deep analysis knowledge base processor 716. In this second pass analysis, the assessment by the deep analysis knowledge base processor 716 looks for cases where the trading referred to in the message relates to the company in which the recipient is an insider. This second pass analysis gives a score (that may be the same as the first pass score if no deep rules update the score) and may generate additional action request(s). This behavior is similar to that generated during the domain-independent assessment. Notice that the processing inside the deep analysis knowledge base processor 716 continues to use the augmented information from earlier steps (e.g., the blackout information about a company.) Table 12 illustrates the results of second pass analysis, by the deep analysis knowledge processor 716, on the MTA-neutral message representation that has been augmented with the results of the first pass analysis. The second pass analysis, that detects possible discussion of trading, is indicated by the fact that the first-pass score was higher than the content threshold and where a recipient is an insider for a company that is (a) mentioned directly in the message and (b) is in a blackout period.

TABLE 12

```
<?xml version="1.0" encoding="UTF-8"?>
<xsl:stylesheet version="1.0"
        xmlns:xsl="http://www.w3.org/1999/XSL/Transform">
<xsl:variable name="riskAssessmentModuleName"
select="'InsiderTrading'"/>
<xsl:variable name="contentThreshold" select="'100'"/>
<xsl:template match="/">
    <!-- layout the output from the assessment -->
    <SecondPassResults>
        <!-- apply the rules for this risk assessment -->
        <Score>
            <RiskAssessmentModule>
                <xsl:value-of select="$riskAssessmentModuleName"/>
            </RiskAssessmentModule>
            <Value>
                <xsl:value-of select="sum(//FirstPassResults//@value)"/>
            </Value>
            <ContentThreshold>
```

TABLE 12-continued

```
                <xsl:value-of select="$contentThreshold"/>
            </ContentThreshold>
        </Score>
        <xsl:apply-templates select="//keyRelationship/status"/>
    </SecondPassResults>
</xsl:template>
<xsl:template match="status">
    <xsl:if test="./text( ) = 'Insider'">
        <!-- cache insider company symbol -->
        <xsl:variable name="insiderCompany"
select="../company/text( )"/>
        <!-- determine if insider company symbol is used in the message
                        content -->
        <xsl:variable name="insiderCompanyInMessage">
            <xsl:choose>
                <xsl:when test="contains(/message/content,
$insiderCompany)">
                    <xsl:text>true</xsl:text>
                </xsl:when>
                <xsl:otherwise>
                    <xsl:text>false</xsl:text>
                </xsl:otherwise>
            </xsl:choose>
        </xsl:variable>
        <!-- determine if insider company is in a blackout period -->
        <xsl:variable name="insiderCompanyBlackout"
                select="//company[@symbol =
                                insiderCompany]/insiderBlackout/ text( )"/>
        <ActionRequest>
            <!-- action requested depends on interplay between insider's
                    company, whether that company is referred to in the
message,
                    and whether that company is in an insider blackout
period -->
            <xsl:choose>
                <xsl:when test="boolean($insiderCompanyInMessage)">
                    <xsl:choose>
                        <xsl:when test="boolean($insiderCompanyBlackout)">
                            <Action>Block Communication</Action>
                            <Reason>Can't discuss trading stock when insider
is in
                            a blackout period.</Reason>
                        </xsl:when>
                        <xsl:otherwise>
                            <Action>Refer Communication To
Compliance</Action>
                            <Reason>Seems to be discussing trading in company
for
                            which customer has been designated an insider.
Not in
                            blackout period.</Reason>
                        </xsl:otherwise>
                    </xsl:choose>
                </xsl:when>
                <xsl:otherwise>
                    <Action>Log Communication</Action>
                    <Reason>Trading references to an insider. No apparent
                    problems.</Reason>
                </xsl:otherwise>
            </xsl:choose>
        </ActionRequest>
    </xsl:if>
</xsl:template>
</xsl:stylesheet>
```

Table 13 illustrates a XML fragment of this second pass analysis by the deep analysis knowledge base processor. This fragment may be inserted into the MTA-neutral representation indicating the second pass score and any Action Requests that the second pass analysis has generated.

TABLE 13

```
<SecondPassResults>
    <Score>
        <RiskAssessmentModule>InsiderTrading</RiskAssessmentModule>
        <Value>118</Value>
        <ContentThreshold>100</ContentThreshold>
    </Score>
    <ActionRequest>
        <Action>Block Communication</Action>
        <Reason>Can't discuss trading stock when insider is in
        a blackout period.</Reason>
    </ActionRequest>
</SecondPassResults>
```

The analysis generated a block communication action 840 because the message's recipient was an insider of CPY2 that is currently in a blackout period and the symbol CPY2 was explicitly mentioned in the message.

The message analyzer 600 uses information from and records information to various databases. Good database design, however, is a complicated task. Most databases are tuned for the data types that are being stored and the actions performed on them. The invention design has separated the types of data into three different data stores.

First there is a configuration data store 1715 which persists information about users, features or options selected etc. This data store will function primarily as a read operation with a small number of write operations occurring. The configuration data store is expected to also contain statistics related to suspect senders including the number of messages from a sender that were blocked, etc.

Second there is an audit data store 895 which records information about message content that occurred including statistics, some of the MTA-neutral information, and perhaps the message itself. This data store will function primarily for writing operations.

Lastly, the knowledge data store, or knowledge bases 720 will contain domain specific information for the knowledge bases in use in each content area covered by the system 1000 (e.g., collusion, harassment, intellectual property protection, explicit sexual content, antitrust etc.). Programmatic access to the data stores will be abstracted behind a data access interface, which will request the data from servlets 1500 embedded in a web server 1700.

The knowledge bases 720 will minimally be composed of a set of key words or phrases related to the content area and a set of rules/heuristics. The broad analysis processor 712, illustrated in FIG. 8, primarily uses the content area key words or phrases. Each content area key word/phrase will be associated with a match score and an occurrence indicator. The deep analysis processor 716, illustrated in FIG. 8 will use the set of rules/heuristics. It is expected that all content areas will have an associated set of key words and phrases. Therefore, a uniform interface to this data may be designed into the knowledge base access API.

The above tables illustrate how to model, write or implement rules/heuristics to provide the outcome that is expected from the various risk assessment modules 630, 640, 650, 660, 665. The rules/heuristics used in these specific examples may be dynamically read from a knowledgebase at the time of assessment to instantiate a number of related rules.

The set of rules/heuristics (stored in 720) used for a content area may vary by content area and by the underlying technology used by the deep analysis processor 716. Developing a uniform interface to this type of data will be harder, although it may be possible to reduce the set of access APIs to one API for each underlying technology/processing type (e.g. one for rule-based system, one for neural nets, etc.).

Following analysis by the risk assessment modules, the risk assessment integrator 670 gathers the results 718 from the various risk assessment modules 630, 640, 650, 660, 665 and integrates those results into an overall metric or score 639. The risk assessment integrator 670 reads a work order from its work order queue 635. At a minimum, the work order will contain (a) the score from the domain-independent risk assessment module 630, (b) the MTA-neutral message representation, and (c) the original unsent message (optional depending on configuration setting.) It may also have a list of other risk assessment modules 640, 650, 660, 665 which was added by risk assessment distributor 620 when it routed the work order (see FIG. 7.)

The risk assessment integrator 670 performs three operations after receiving a work order 615. It will wait until it has received a response from each risk assessment module 640, 650, 660, 665. After receiving the response, the risk assessment evaluator 637 calculates an overall risk assessment score 639 for the entire message contents based on processing the scores from all the risk assessment modules 640, 650, 660, 665 including the domain-independent risk assessment module 630. Lastly, it augments the MTA-neutral message representation with the overall risk assessment score 639 and then passes the completed risk assessment to the action manager 800.

The overall risk assessment score 639 is based on looking across the content areas. This score 639 is intended to capture the cases where the message content may cross content area boundaries. Consider the case where the message content has not yet exceeded the Fraud threshold or the Collusion threshold, that were assigned separately by the Fraud and Collusion risk assessment modules, but still scores high. This aggregate high score is derived from the overall risk assessment score 639 computed for the message.

A set of default algorithms looks across the content areas and computes the overall score. Values, variables, and ratios used in these scoring algorithms 637 are customizable through the configuration user interface 1400, 1500, 1600.

For example, a business has installed and configured the following four domain-specific risk assessment modules: InsiderTrading, FraudDetector, Harrassment and SexualContentDetector. From a business perspective, the business decided to correlate Insider Trading Content with Fraud Detection content. The business also has a strict Sexual Harassment Policy. The following scoring rule may be built as shown in Table 14.

TABLE 14

ScoringRule: FraudAndInsiderTrading

AcrossContentAreaScore = InsiderTrading Score + FraudDetector Score

TABLE 14-continued

```
FraudAndInsideTradingThreshold = (InsiderTrading Content Threshold + Fraud
Detector Content Threshold)/2
If(AcrossContentAreaScore >= FraudAndInsideTradingThreshold)
then Mark Message as suspect in content areas Fraud & InsiderTrading
       Action Request: Refer Communication to Compliance
ScoringRule: HarrassmentAndSexualContent
AcrossContentAreaScore = Harassment Score + SexualContent Score
If ((AcrossContentAreaScore >= (Harassment Content Threshold) ||
    (AcrossContentAreaScore) >= (SexualContentDetector Content Threshold))
       then Mark Message as suspect in content areas Harrassment & SexualContent
Action Request: Block Communication, Deep Audit.
```

The risk assessment integrator 670 would apply these scoring rules, to look across content areas and calculate an overall risk assessment metric and update the partial MTA-neutral representation of the message shown in Table 15 that resulted from the independent scoring of the two domain-specific risk assessment modules.

TABLE 15

```
<Score>
    <RiskAssessmentModule>InsiderTrading</RiskAssessmentModule>
    <Value>88</Value>
    <ContentThreshold>100</ContentThreshold>
</Score>
<Score>
    <RiskAssessmentModule>FraudDetector</RiskAssessmentModule>
    <Value>20</Value>
    <ContentThreshold>80</ContentThreshold>
</Score>
```

For this example, the scoring rule FraudAndInsideTrading would execute the rule shown in Table 14 as described in Table 16.

TABLE 16

```
AcrossContentAreaScore = 88 + 20
If (AcrossContentAreaScore >= ((100 + 80)/2))
then 'Mark Message as suspect in content areas Fraud & InsiderTrading'
    Action Request: Refer Communication to Compliance
```

In the examples of Tables 14-16, the message contents did not exceed the threshold for either InsideTrading or for Fraud Detection. However, the risk assessment integrator 670 determined that the message contents were suspect by looking at both the InsiderTrading score and the Fraud Score. The MTA-neutral message representation would be augmented and the results would be passed on to the action manager 800.

FIG. 9 illustrates the action manager module 800. After receiving a message from the message analyzer 600, the action manager 800 has responsibility to determine the set of action(s) that it should perform on each message and invoke those action(s). There are multiple categories of possible actions for the action determination module 810.

For example, the action manager 800 may take a configurable action in which a system administrator had configured some actions when the software was installed. Other actions are driven by business decisions such as: a business decision was made to enable deep auditing therefore, the occurrence of the message will be persisted in the audit DB. It may take a requested action when the domain-independent risk assessment module requests an explicit action. This action will be carried out unless it conflicts with a configuration option.

The action determination module 810 may also take a score based action. If a domain-independent risk assessment module 630 scored the message contents at a value higher than its threshold, then the document is considered to pertain to that content area. The configuration rules then are examined to determine whether to block a threshold exceeding score, or whether to send the message. Additionally, the action determination module 810 may examine the overall score assigned to the message by the risk assessment integrator to determine the action(s) to take.

As a set of action requests is determined, each action is placed in an ActionEnvelope. When the final ActionEnvelope has been calculated (containing the complete set of configured actions, requested actions, and score-based actions determined from the message), a final step in the action determination component 810 examines the set of actions in the ActionEnvelope and determines whether some actions in the ActionEnvelope render other actions unnecessary. In this step, a set of configured rules indicate the precedence of operation on the rules. For example, a block message action may override a hold message action; a deep logging request may override a shallow logging request, etc. Applying these precedence rules results in a minimal set of actions that are then passed on to the action orchestrator 820.

The precedence rules may result in a variety of actions. For example, multiple requests for the same action may be thinned into a single action request. Within the message audit trail 890, deep logging may take precedence over shallow logging. Therefore, the presence of a single deep logging request may result in the removal of all other shallow logging action requests. A block message action 840, 850 request may override and remove any send electronic message action request 830. A refer message to compliance action request 826 may override and remove any send electronic message action request 830. A block message action 840, 850 request may override a refer message to compliance action request 826.

Once the action determination module 810 has determined a set of actions, the action orchestrator 820 is responsible for performing each action in the set. The mapping is accomplished by using the configuration component (implemented in 1710, 1715) to connect each possible action to an underlying application or tool that invokes the action. This is similar to the application mapper provided in Windows for mapping which applications are used to launch which file types.

FIG. 9 illustrates a variety of action mappings that the action orchestrator 820 may take. It may send message action 830 to pass the original message along to the 'real' MTA 140 for the email system in which the system 1000 is deployed. This may be accomplished by a wrapper program that makes the system calls to the enterprise's actual SMTP transport or by calling a command line program that accomplishes the same task.

The action orchestrator 820 may take a log message action 890. This action is associated with a program that has been written to put the basic logging information (or, in the case of deep logging, the entire MTA-neutral message representation) of the message into an audit database 895.

A block message action 840, 850 may be associated with possible variations for (a) returning the message as rejected to the sender and/or 825 (b) forwarding the message to the compliance organization for possible follow-up action 826.

A refer message to compliance action 826, 850 may be associated with a program that places the message in an 'action queue' (implemented in 827) that the enterprise's compliance group monitors. This program would know how to convert the MTA-neutral message representation into an understandable UI (implemented in 1400, 1500, 1600) that would show the reason(s) for referring the message to compliance and would allow the person reviewing the blocked message a simple user interface for blocking the message. The compliance group may return the message to the sender with reasons for blocking or rejecting the message and, optionally, logging the action that was taken.

The action orchestrator 820 may take a variety of notify and hold actions 822, 825, 826. A notify and hold actions 822, 825, 826 may be associated with programs that support a variety of notify and hold behaviors. Each behavior specifies who should be notified and directs the message for saving to the temporary 'Held, Suspect Message Store.' The person/role that is notified is given access privileges to take manual action on the message that is being held. Examples may include a notify and hold for sender or notify and hold for compliance group (implemented via user-interface 827).

For the notify and hold for sender action 825, the action notifies the sender that the electronic message he/she sent has been marked as 'suspect' and is being held for further action. The notification may be accomplished by generating a new message with an embedded HTML hyperlink to a held message handler application where the sender may log in, view the message, and act on it. The possible outcomes that may be programmed into the notify and hold for sender action 825 include deleting the message, modifying the message and re-sending, and passing the unaltered message onto the compliance group for final determination 827. Each of these actions may or may not be specified for logging.

In the notify and hold for compliance group action 822, 826, the action notifies the compliance group that a message has been marked as 'suspect' and is being held for further action. The notification may be accomplished by generating a new message with an embedded HTML hyperlink to a held message handler application or the message may be added to a separate application's 'Inbox' of messages waiting for processing. The possible outcomes that may be programmed into the notify and hold for compliance group action 826 include delete message 860 with or without informing the sender, reject message with or without informing the sender to modify and resend 870, and sending the message unchanged 830. Each of these actions may or may not be specified for shallow or deep logging.

The action orchestrator may also take an expunge action 860. This action may be associated with a program that would know how to block the message from further action and remove all references to the message from the various enterprise message stores, etc.

Additionally, the action orchestrator 820 may take other actions 870. It may persist the message in the audit DB 895. It may alert that a message has been processed. The alert may be configured to be triggered depending on different conditions including outcome of message analysis (message sent, held, rejected, etc.) or other message action taken and brought to the attention of the sender, compliance group, or some other addressable entity. The alert may be accomplished by sending email, sending an instant message, pager notification, sending a voice message to phone/voicemail, communicating by a cellular or a land-line phone, or a PDA device, etc. The action orchestrator 820 may escalate the message by bringing it to the attention of others at a higher level in the organization that a specific message has been processed or action has been taken. The same type of notification and mechanism of the alert action may also be used for the escalate action.

System 1000 may also be used to filter telephony communications. Examples of the system 1000 for telephony cover a wide range of possibilities. Some of which are more immediately attainable and some of which require advances in related technologies. For example, a use of telephony systems in the short-term would be to build an MTA-neutral message representation of information that is already available in common telephony applications: phone number placing the call, destination phone call, etc. Simple analysis and filtering may be performed to allow or disallow calls based on who's calling whom and the ramifications of what's known about the caller/callee using rules similar to those described earlier in this disclosure. More advanced applications would be possible in terms of telephone voicemail processing and post-processing of phone calls. This would become possible once technologies and regulations allow the recording of phone calls and transforming the conversation from voice into some kind of MTA-neutral text representation becomes sufficiently accurate and efficient.

The invention, furthermore, may be used to filter instant messages. The invention involves a message accessor module 500 that receives or retrieves electronic messages such that they may be processed by a message analyzer module 600. The examples show how messages may be accessed using existing email protocols such as SMTP. The examples also describe the implementation of a proxy service for FTP file 'put' operations or acting as a proxy between a user's instant messaging (IM) client such as AOL Instant Messenger (AIM) or Microsoft Messenger™. All that is necessary for the architecture to work is the ability to access the message/file/document in its native format and have the ability to knowledgeably read that format. For example, a message accessor 500 that received a raw AIM instant message may parse the message for the salient components such as sender, recipient, message body, attachments, etc., and create the MTA-neutral format that is described and used in the rest of the invention. Similarly, the ability to access and pass a message (the original or a new/modified version of the message) to the actual implementation of the instant messaging server would allow the building of the proper 'back end' action for the action manager 800 component. It would also allow the full implementation all of the examples shown as 'email' examples as 'instant messaging' examples instead.

What this means is that the invention's architecture and design may be implemented as a communications manager for any electronic communications media provided that the following 'hooks' into existing systems and/or protocols may be made. The existing system must have the ability to read and receive the raw, native format of the documents/files/messages for the given communications mechanism. Obtaining full utility and functionality requires the ability to parse the semantics of the document/file/message in terms of identifying the sender/author, recipient/audience, content, attachments, etc. In all cases, the required format-/protocol-specific work involves parsing the raw, native format into what is called MTA-neutral format in this architecture/design. Once the document/file/message is in MTA-neutral format, the rest of the architecture/design will apply on the item being processed regardless of its origin. The knowledge, related to parsing the incoming document, is typically applied to writing an outbound document. Once a program is written to put the MTA-neutral message representation into raw, native format for a given communications mechanism, it is only necessary to know how to connect to a server that may handle that raw, native format and to put the native message into that server.

The detailed description of the present invention is directed to the handling and analyzing of outbound electronic messages. However, the present invention is also amenable to providing the same kind of processing on inbound messages (e.g., email, IM.) In this case, the message accessor 500 would run on messages that are received into an inbound electronic message store (for example, a POP protocol typically found on port 110 of a Unix/Linux system or an IMAP message store.) In an instant messaging (IM) sense, the system 1000 may act as both an inbound and outbound filter on a user's IM traffic because his/her connection through a system 1000 may run the message accessor 500 on both inbound and outbound messages. For example, if Company XYZ has installed a system 1000 on their corporate IM infrastructure and the user initiates a 'chat' with a user outside the corporate firewall, then (a) the 'outbound' system 1000 could receive messages typed and sent by the internal user and process them before passing them along to the 'real' IM message server to be sent to the outside user, and (b) messages received from the outside user, could be trapped and processed by the 'inbound' system 1000 before being forwarded along to the internal user's IM client.

The system 1000 is configured so that a business may define and enable the set of actions suitable for their specific business needs. To achieve this, the system 1000 provides configuration subsystems 1100, 1710, 1715, 1720 with a series of user interfaces pages 1500, 1600 that will enable the appropriately privileged user to set those options.

Figure 10:
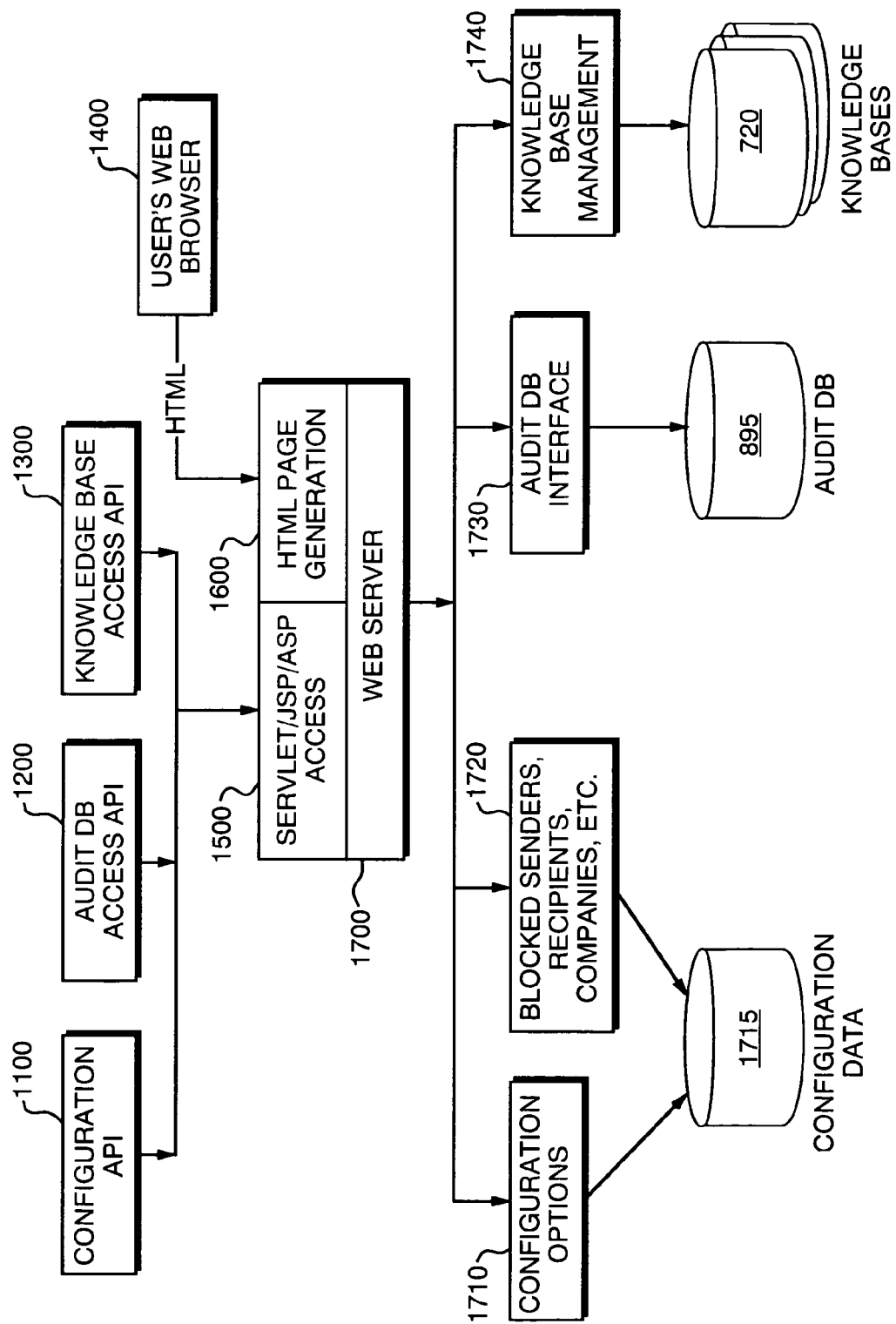
FIG. 10 illustrates the configuration data store, the audit data base and user interface, of the electronic messaging filter system, in accordance with a preferred embodiment of the present system.

FIG. 10 illustrates the configuration subsystems 1100, 1710, 1715, 1720. This subsystem enables both programmatic and user access to the configuration data 1715 and other data stores 720, 895. The programmatic access will be utilized by other subsystems during initialization and at runtime. A web server 1700 provides access to the data stores 1715, 720, 895. This design facilitates the deployment and configuration of the system 1000 because all access to the data itself will be centralized: access for generation of user interface screens, access by a risk assessment module scoring message content, etc.

Consider the following example of programmatic access: the system 1000 may, in addition to filtering messages based on content, block messages between two particular parties or on a given topic. The system 1000 may determine that two parties are having a suspect communication. A compliance manager may then decide to block communications between these two parties. In this scenario, the compliance manager would use his/her web browser 1400 to access a specially designed input screen which would enable them to enter information about the two parties, and perhaps a topic of conversation it wants blocked. The data would then be entered into the configuration data store 1715.

The domain-independent risk assessment module 630 may gain access to this same set of data through the configuration API 1100 to ensure that the appropriate communications management took place.

Figure 11:
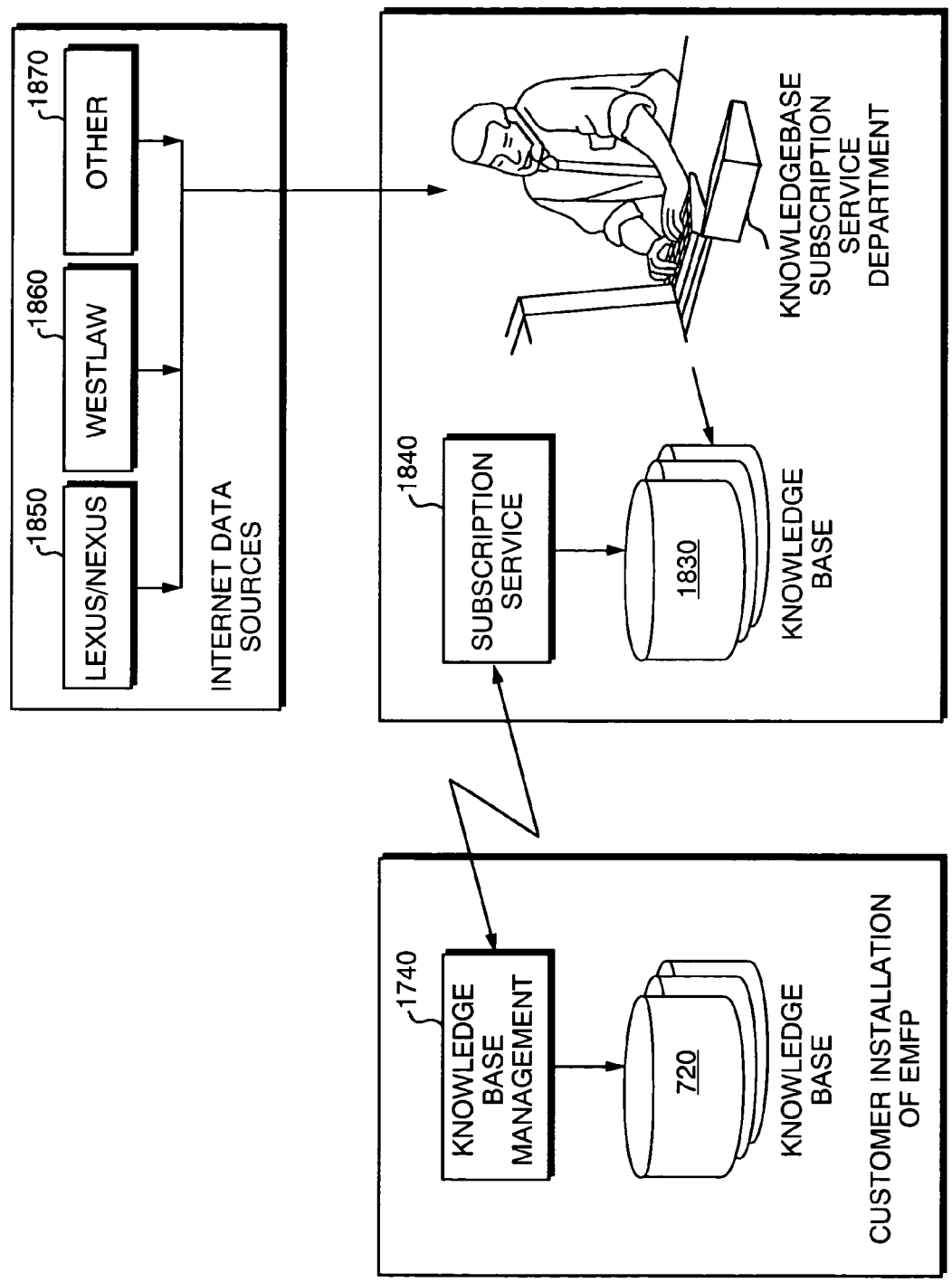
FIG. 11 illustrates the knowledge base update subsystem, of the electronic messaging filter system, in accordance with a preferred embodiment of the present system.
Figure 12:
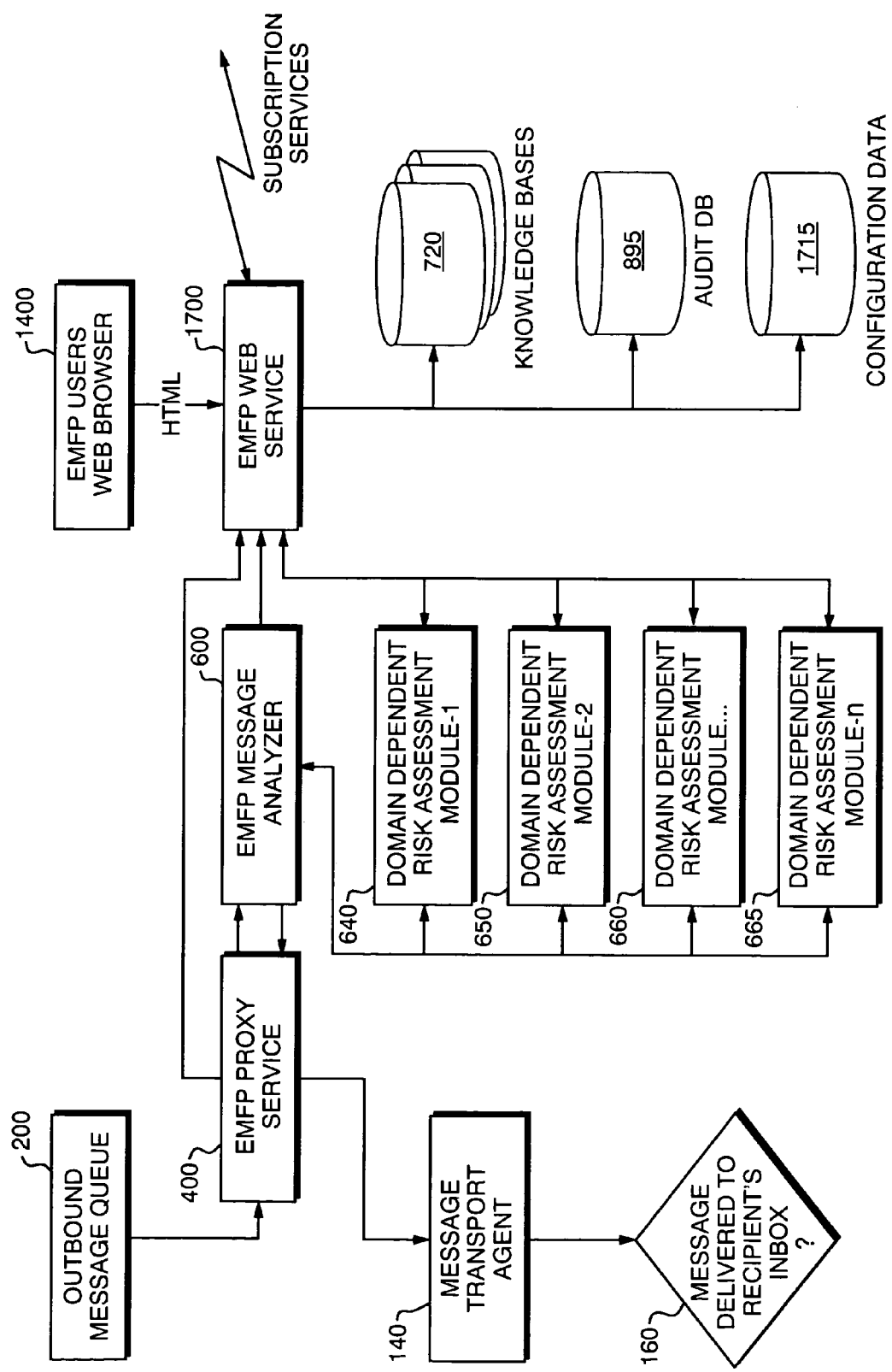
FIG. 12 illustrates the electronic messaging filter system, in accordance with a preferred embodiment of the present invention.

As noted earlier, knowledge bases will contain the domain-dependent data that enables the risk assessment modules 640, 650, 660, 665 to score a message. FIG. 11 illustrates a knowledge base management subsystem. It is expected that, for particular domains, the supporting data that enables the invention to score a document may change frequently. To this end, the knowledge base management subsystem 1740 of a customer's system 1000 may automatically contact the knowledge base subscription service department 1840 to update the customer's knowledge bases 720.

Domain experts in the knowledge base subscription service department 1840 will be responsible for staying current with changes in their areas of expertise (domains). These experts will update a central knowledge base with the evolving set of domain expertise. A customer's installation may then automatically update its installed knowledge bases such that the knowledge bases stay current with changes in laws and the supporting data.

This data flow is illustrated in FIG. 11. In this figure, a representative or domain expert is scanning several online data stores including Lexus/Nexus™ 1850, Westlaw™ 1860, and other sources 1870 to learn about the ever-changing laws and requirements about a particular domain. The representative is then responsible for making updates to the central knowledge base 1830 maintained within the knowledge base subscription service department. A customer's system 1000 (including 1740) then automatically contacts the subscription service 1840 and updates its local knowledge bases 720.

The user interface of the system 1000 may perform different actions including: enabling or disabling certain features such as auditing or the domain-independent risk assessment module; generating reports of suspect message(s); or updating the knowledge base 720 with new data by using the automatic subscription services provided by the knowledge base content vendor. It may also perform the compliance manager functions: including the ability to review/manually process suspect messages; or other screens as necessary by user interfaces 1500, 1600.

High level Application Programming Interfaces (APIs) 1100, 1200, 1300 will be provided to give any of the subsystems access to the system 1000 data. By encapsulating the access to the data behind an API, the physical data schema may change without adversely affecting the larger system. This design pattern allows the location of databases on one or more physical computers while other components of the system 1000 reside on different computers or in an embedded device/appliance. Data access interface layers are used for access to the audit DB 895 and to the knowledge base 720.

The configuration data store 1715 will contain a series of data elements/data tables related to: users acting as senders and recipients; companies; message topics; features which have been enabled/disabled; or statistics. This information is used depending upon which configuration option(s) is/are turned on.

The present invention may be embodied in other specific forms without departing from the spirit or essential attributes of the invention. Accordingly, reference should be made to the appended claims, rather than the foregoing specification, as indicated the scope of the invention.

What is claimed is:

1. A method for identifying content that is not authorized by a business or is deemed to be harmful to the business, in an unsent electronic message composed by a sender affiliated with the business, wherein the unsent electronic message is stored on at least one computer associated with the business, comprising the steps of:

(a) prior to transmission of the unsent electronic message from a server associated with the business to a recipient and in response to a request of the sender to transmit the electronic message to the recipient, applying the unsent electronic message to an electronic screening tool programmed to identify content that is not authorized by the business or is deemed to be harmful to the business;

(b) generating an output signal if the electronic screening tool determines that the unsent electronic message contains content that is not authorized by the business or is deemed to be harmful to the business, and (c) in response to said output signal:
  (i) automatically canceling the request of the sender to transmit the electronic message to the recipient and
  (ii) automatically expunging the unsent electronic message, wherein said expunging step results in the unsent electronic message being absent from the at least one computer associated with the business and the server if the unsent electronic message was previously stored on the server, and all references to the unsent electronic message being removed from one or more message stores associated with the at least one computer and the server.

2. The method of claim 1, further comprising the following step: (c) if the electronic screening tool determines that the unsent electronic message contains content that is unauthorized by the business or is deemed to be harmful to the business, transmitting the unsent electronic message to the recipient only if the sender or a supervisor sends a further transmission request following receipt of an alert message.

3. The method of claim 1, further comprising the following step: (d) notifying a designee whether the unsent electronic message was subsequently sent by the sender.

4. The method of claim 1, wherein the unsent electronic message is an unsent e-mail message.

5. The method of claim 1, wherein the unsent electronic message is an unsent instant message.

6. The method of claim 1, wherein the unsent electronic message is an unsent message intended for a chat room.

7. The method of claim 1, wherein the electronic screening tool is programmed to identify content indicative of corporate collusion.

8. The method of claim 1, wherein the electronic screening tool is programmed to identify content indicative of corporate fraud.

9. The method of claim 1, wherein the electronic screening tool is programmed to identify content indicative of securities fraud.

10. The method of claim 1, wherein the electronic screening tool is programmed to identify content indicative of price fixing.

11. The method of claim 1, wherein the electronic screening tool is programmed to identify content indicative of workplace harassment.

12. The method of claim 1, wherein the electronic screening tool is programmed to identify content indicative of unlawful manipulation.

13. The method of claim 1, wherein the electronic screening tool is programmed to identify content indicative of workplace discrimination.

14. The method of claim 1, wherein the electronic screening tool is programmed to identify content indicative of an antitrust violation.

15. The method of claim 1, wherein the electronic screening tool is programmed to identify content that is unauthorized by the business due to an organizational rank of the sender in the business.

16. The method of claim 1, wherein the electronic screening tool uses a neural network to identify content that is unauthorized by the business.

17. The method of claim 1, wherein the electronic screening tool includes at least one database that is updated periodically based on changes to law.

18. The method of claim 1, wherein the electronic screening tool identifies content that is unauthorized by the business based at least in part on an analysis of a pattern of communication with at least one of the sender or recipient.

* * * * *